United States Patent
Burcham et al.

(10) Patent No.: US 9,590,938 B1
(45) Date of Patent: Mar. 7, 2017

(54) SYSTEM AND METHOD FOR IDENTIFYING A MOBILE DEVICE WITH NEAR REAL TIME VISUALIZATION TO ACTION

(71) Applicant: Sprint Communications L.P., Overland Park, KS (US)

(72) Inventors: Robert H. Burcham, Overland Park, KS (US); Jason R. Delker, Olathe, KS (US); Robin D. Katzer, Louisburg, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 677 days.

(21) Appl. No.: 14/024,627

(22) Filed: Sep. 11, 2013

(51) Int. Cl.
*G06F 15/16* (2006.01)
*H04L 12/58* (2006.01)

(52) U.S. Cl.
CPC .................................. *H04L 51/20* (2013.01)

(58) Field of Classification Search
CPC ....................................................... H04L 51/20
See application file for complete search history.

(56) References Cited

U.S. PATENT DOCUMENTS

| | | |
|---|---|---|
| 5,636,346 A | 6/1997 | Saxe |
| 5,761,648 A | 6/1998 | Golden et al. |
| 5,848,396 A | 12/1998 | Gerace |
| 5,848,397 A | 12/1998 | Marsh et al. |
| 5,918,014 A | 6/1999 | Robinson |
| 5,918,041 A | 6/1999 | Berstis |
| 5,933,811 A | 8/1999 | Angles et al. |
| 5,937,392 A | 8/1999 | Alberts |
| 5,974,398 A | 10/1999 | Hanson et al. |
| 6,202,023 B1 | 3/2001 | Hancock et al. |
| 6,233,566 B1 | 5/2001 | Levine et al. |
| 6,266,649 B1 | 7/2001 | Linden et al. |
| 6,286,005 B1 | 9/2001 | Cannon |
| 6,317,722 B1 | 11/2001 | Jacobi et al. |

(Continued)

FOREIGN PATENT DOCUMENTS

| | | |
|---|---|---|
| WO | WO03044703 A1 | 5/2003 |
| WO | WO2012093396 A1 | 7/2012 |
| WO | WO2015038562 A1 | 3/2015 |

OTHER PUBLICATIONS

Office Action—Restriction requirement dated Jun. 17, 2008, U.S. Appl. No. 11/405,195, filed Apr. 17 2006, 7 pages.

(Continued)

*Primary Examiner* — Jonathan Bui

(57) ABSTRACT

A message distribution system for distributing messages to qualified mobile devices comprises an analytics system configured to identify mobile devices associated with one or more qualifiers, generate a list of mobile devices based on the association with the one or more qualifiers. A data visualization system may identify mobile devices from the list of one or more mobile devices is located at a selected geographic area and transmit a list of one or more mobile device located at a selected geographic area and associated with one or more qualifiers. A common campaign system may transmit the qualifiers to at least the analytics system to identify the mobile devices associated with the one or more qualifiers, and send a message to the mobile devices on the list of mobile devices located at a selected geographic area and associated with one or more qualifiers.

20 Claims, 7 Drawing Sheets

(56) References Cited

U.S. PATENT DOCUMENTS

| | | | |
|---|---|---|---|
| 6,321,983 B1 | 11/2001 | Katayanagi et al. |
| 6,332,127 B1 | 12/2001 | Bandera et al. |
| 6,826,575 B1 | 11/2004 | Waclawski |
| 6,834,266 B2 | 12/2004 | Kumar et al. |
| 6,839,680 B1 | 1/2005 | Liu et al. |
| 6,853,982 B2 | 2/2005 | Smith et al. |
| 6,910,017 B1 | 6/2005 | Woo et al. |
| 6,963,867 B2 | 11/2005 | Ford et al. |
| 6,966,536 B2 | 11/2005 | Enomoto et al. |
| 6,990,462 B1 | 1/2006 | Wilcox et al. |
| 7,022,905 B1 | 4/2006 | Hinman et al. |
| 7,065,532 B2 | 6/2006 | Elder et al. |
| 7,096,194 B2 | 8/2006 | Johnson |
| 7,127,313 B2 | 10/2006 | Neri |
| 7,143,143 B1 | 11/2006 | Thompson |
| 7,251,615 B2 | 7/2007 | Woo |
| 7,284,033 B2 | 10/2007 | Jhanji |
| 7,353,267 B1 | 4/2008 | Cunningham et al. |
| 7,406,436 B1 | 7/2008 | Reisman |
| 7,437,308 B2 | 10/2008 | Kumar et al. |
| 7,481,367 B2 | 1/2009 | Fees et al. |
| 7,647,258 B2 | 1/2010 | William et al. |
| 7,676,394 B2 | 3/2010 | Ramer et al. |
| 7,680,899 B1 | 3/2010 | Barnes et al. |
| 7,698,335 B1 | 4/2010 | Vronay |
| 7,788,644 B2 | 8/2010 | Koduru et al. |
| 7,801,518 B1 | 9/2010 | Urbanek |
| 7,840,498 B2 | 11/2010 | Frank et al. |
| 7,958,005 B2 | 6/2011 | Dangaltchev |
| 7,974,616 B1 | 7/2011 | Urbanek |
| 8,214,454 B1 | 7/2012 | Barnes et al. |
| 8,326,673 B1 | 12/2012 | Biere et al. |
| 8,355,955 B1 | 1/2013 | Mirchandani et al. |
| 8,423,408 B1 | 4/2013 | Barnes et al. |
| 8,442,858 B1 | 5/2013 | Barnes et al. |
| 8,509,821 B1 * | 8/2013 | Zang ............... H04W 68/025 370/214 |
| 9,275,390 B1 | 3/2016 | Barnes et al. |
| 9,319,379 B1 | 4/2016 | Burcham et al. |
| 9,374,335 B2 | 6/2016 | Burcham et al. |
| 2001/0039500 A1 | 11/2001 | Johnson |
| 2001/0044743 A1 | 11/2001 | McKinley et al. |
| 2001/0047294 A1 | 11/2001 | Rothschild |
| 2002/0010627 A1 | 1/2002 | Lerat |
| 2002/0013727 A1 | 1/2002 | Lee |
| 2002/0026355 A1 | 2/2002 | Mitsuoka et al. |
| 2002/0026361 A1 | 2/2002 | Blom |
| 2002/0030100 A1 | 3/2002 | Katayanagi et al. |
| 2002/0032771 A1 | 3/2002 | Gledje |
| 2002/0035474 A1 | 3/2002 | Alpdemir |
| 2002/0059387 A1 | 5/2002 | Wolfe |
| 2002/0060246 A1 | 5/2002 | Gobburu et al. |
| 2002/0065713 A1 | 5/2002 | Awada et al. |
| 2002/0091569 A1 | 7/2002 | Kitaura et al. |
| 2002/0091571 A1 | 7/2002 | Thomas et al. |
| 2002/0095333 A1 | 7/2002 | Jokinen et al. |
| 2002/0107027 A1 | 8/2002 | O'Neil |
| 2002/0128904 A1 | 9/2002 | Carruthers et al. |
| 2002/0128908 A1 | 9/2002 | Levin et al. |
| 2002/0143630 A1 | 10/2002 | Steinman et al. |
| 2002/0152133 A1 | 10/2002 | King et al. |
| 2002/0165849 A1 | 11/2002 | Singh et al. |
| 2002/0184080 A1 | 12/2002 | Murad et al. |
| 2003/0004802 A1 | 1/2003 | Callegari |
| 2003/0004808 A1 | 1/2003 | Elhaoussine et al. |
| 2003/0007643 A1 | 1/2003 | Ben-Zur et al. |
| 2003/0018516 A1 | 1/2003 | Ayala et al. |
| 2003/0018558 A1 | 1/2003 | Heffner et al. |
| 2003/0023482 A1 | 1/2003 | Messner et al. |
| 2003/0028451 A1 | 2/2003 | Ananian |
| 2003/0032409 A1 | 2/2003 | Hutcheson et al. |
| 2003/0050863 A1 | 3/2003 | Radwin |
| 2003/0074251 A1 | 4/2003 | Kumar et al. |
| 2003/0074259 A1 | 4/2003 | Slyman, Jr. et al. |
| 2003/0101024 A1 | 5/2003 | Adar et al. |
| 2003/0101449 A1 | 5/2003 | Bentolila et al. |
| 2003/0126250 A1 | 7/2003 | Jhanji |
| 2003/0171962 A1 | 9/2003 | Hirth et al. |
| 2003/0172007 A1 | 9/2003 | Helmolt et al. |
| 2003/0229502 A1 | 12/2003 | Woo |
| 2004/0019540 A1 | 1/2004 | William et al. |
| 2004/0019541 A1 | 1/2004 | William et al. |
| 2004/0111315 A1 | 6/2004 | Sharma et al. |
| 2004/0148628 A1 | 7/2004 | Mears |
| 2004/0194052 A1 | 9/2004 | Hoffschulz et al. |
| 2005/0021403 A1 | 1/2005 | Ozer et al. |
| 2005/0028188 A1 | 2/2005 | Latona et al. |
| 2005/0078660 A1 | 4/2005 | Wood |
| 2005/0101332 A1 | 5/2005 | Kotzin |
| 2005/0102272 A1 | 5/2005 | Kumar et al. |
| 2005/0114829 A1 | 5/2005 | Robin et al. |
| 2005/0177419 A1 | 8/2005 | Choi et al. |
| 2005/0193036 A1 | 9/2005 | Phillips et al. |
| 2005/0194431 A1 | 9/2005 | Fees et al. |
| 2005/0197887 A1 | 9/2005 | Zuerl et al. |
| 2005/0197918 A1 | 9/2005 | Wittmer et al. |
| 2005/0215238 A1 | 9/2005 | Macaluso |
| 2005/0228754 A1 | 10/2005 | Pezzaniti et al. |
| 2005/0245246 A1 | 11/2005 | Munch et al. |
| 2005/0246394 A1 | 11/2005 | Neri |
| 2005/0254712 A1 * | 11/2005 | Lindeman ............... G06K 9/00 382/224 |
| 2005/0256759 A1 | 11/2005 | Acharya et al. |
| 2005/0278296 A1 | 12/2005 | Bostwick |
| 2006/0074769 A1 | 4/2006 | Looney et al. |
| 2006/0080135 A1 | 4/2006 | Frank et al. |
| 2006/0080171 A1 | 4/2006 | Jardins et al. |
| 2006/0085253 A1 | 4/2006 | Mengerink et al. |
| 2006/0085517 A1 | 4/2006 | Kaurila |
| 2006/0141428 A1 | 6/2006 | Herrod et al. |
| 2006/0178932 A1 | 8/2006 | Lang |
| 2006/0212350 A1 | 9/2006 | Ellis et al. |
| 2006/0223495 A1 | 10/2006 | Cassett et al. |
| 2006/0224437 A1 | 10/2006 | Gupta et al. |
| 2007/0005647 A1 | 1/2007 | Cugi et al. |
| 2007/0022009 A1 | 1/2007 | Cataldi et al. |
| 2007/0026871 A1 | 2/2007 | Wager |
| 2007/0060099 A1 | 3/2007 | Ramer et al. |
| 2007/0061229 A1 | 3/2007 | Ramer et al. |
| 2007/0094042 A1 | 4/2007 | Ramer et al. |
| 2007/0100963 A1 | 5/2007 | Ban et al. |
| 2007/0106520 A1 | 5/2007 | Akkiraju et al. |
| 2007/0130005 A1 | 6/2007 | Jaschke |
| 2007/0192715 A1 | 8/2007 | Kataria et al. |
| 2007/0198339 A1 | 8/2007 | Shen et al. |
| 2007/0208619 A1 | 9/2007 | Branam et al. |
| 2007/0239518 A1 | 10/2007 | Chung et al. |
| 2008/0004884 A1 | 1/2008 | Flake et al. |
| 2008/0010137 A1 | 1/2008 | Ho et al. |
| 2008/0040175 A1 | 2/2008 | Dellovo |
| 2008/0045245 A1 * | 2/2008 | Billmaier ............... H04W 4/02 455/457 |
| 2008/0065476 A1 | 3/2008 | Klein et al. |
| 2008/0082412 A1 | 4/2008 | Tallyn et al. |
| 2008/0090599 A1 * | 4/2008 | Patel ............... H04W 4/02 455/466 |
| 2008/0097851 A1 | 4/2008 | Bemmel et al. |
| 2008/0104637 A1 | 5/2008 | Rodriguez et al. |
| 2008/0120565 A1 | 5/2008 | Stiso et al. |
| 2008/0126515 A1 | 5/2008 | Chambers et al. |
| 2008/0140476 A1 | 6/2008 | Anand et al. |
| 2008/0147478 A1 | 6/2008 | Mall et al. |
| 2008/0228583 A1 | 9/2008 | MacDonald et al. |
| 2009/0029721 A1 | 1/2009 | Doraswamy |
| 2009/0048977 A1 | 2/2009 | Aggarwal et al. |
| 2009/0070129 A1 | 3/2009 | Inbar et al. |
| 2009/0076899 A1 | 3/2009 | Gbodimowo |
| 2009/0150215 A1 | 6/2009 | Kalb et al. |
| 2009/0157512 A1 | 6/2009 | King |
| 2009/0198580 A1 | 8/2009 | Broberg et al. |
| 2009/0222329 A1 | 9/2009 | Ramer et al. |
| 2009/0256858 A1 | 10/2009 | Ogikubo et al. |
| 2009/0265245 A1 | 10/2009 | Wright |
| 2009/0271255 A1 | 10/2009 | Utter et al. |

(56) References Cited

U.S. PATENT DOCUMENTS

| | | |
|---|---|---|
| 2009/0292608 A1 | 11/2009 | Polachek |
| 2010/0082422 A1 | 4/2010 | Heilig et al. |
| 2010/0082429 A1 | 4/2010 | Samdadiya et al. |
| 2010/0119111 A1 | 5/2010 | Helfman et al. |
| 2010/0222035 A1 | 9/2010 | Robertson et al. |
| 2010/0228592 A1 | 9/2010 | Anderson et al. |
| 2011/0082939 A1 | 4/2011 | Montemurro et al. |
| 2011/0106622 A1 | 5/2011 | Kuhlman et al. |
| 2011/0131109 A1 | 6/2011 | Pappas et al. |
| 2011/0246890 A1 | 10/2011 | Mellamphy et al. |
| 2011/0258049 A1 | 10/2011 | Ramer et al. |
| 2011/0270687 A1 | 11/2011 | Bazaz |
| 2011/0288913 A1 | 11/2011 | Waylonis et al. |
| 2012/0072271 A1 | 3/2012 | Dessert et al. |
| 2012/0123830 A1 | 5/2012 | Svendsen et al. |
| 2012/0170521 A1 | 7/2012 | Vogedes et al. |
| 2012/0179536 A1 | 7/2012 | Kalb et al. |
| 2012/0215911 A1 | 8/2012 | Raleigh et al. |
| 2013/0006743 A1 | 1/2013 | Moore et al. |
| 2013/0018714 A1 | 1/2013 | George |
| 2013/0060631 A1 | 3/2013 | Corson et al. |
| 2013/0115872 A1* | 5/2013 | Huang ............... H04W 4/02 455/3.01 |
| 2013/0211925 A1 | 8/2013 | Holland |
| 2013/0211941 A1 | 8/2013 | Hallowell et al. |
| 2013/0304586 A1 | 11/2013 | Angles et al. |
| 2013/0311293 A1 | 11/2013 | Ward et al. |
| 2013/0331027 A1 | 12/2013 | Rose et al. |
| 2014/0006129 A1* | 1/2014 | Heath ............... G06Q 30/0222 705/14.23 |
| 2014/0059141 A1 | 2/2014 | Belkin et al. |
| 2014/0066029 A1 | 3/2014 | Brennan et al. |
| 2014/0080467 A1 | 3/2014 | Urbanek |
| 2014/0089113 A1 | 3/2014 | Desai et al. |
| 2014/0136314 A1 | 5/2014 | Kiet et al. |
| 2014/0222569 A1* | 8/2014 | Kerr ............... C07K 14/705 705/14.58 |
| 2014/0235265 A1* | 8/2014 | Slupik ............... H04W 4/02 455/456.1 |
| 2014/0274031 A1* | 9/2014 | Menendez ....... H04W 52/0209 455/426.1 |
| 2014/0278953 A1 | 9/2014 | Ismail et al. |
| 2014/0379448 A1 | 12/2014 | Gregory |
| 2014/0379467 A1 | 12/2014 | Huang et al. |
| 2015/0074204 A1 | 3/2015 | Burcham et al. |
| 2015/0121418 A1 | 4/2015 | Jain et al. |
| 2015/0208199 A1* | 7/2015 | Li ............... H04W 24/08 455/456.1 |
| 2015/0249914 A1* | 9/2015 | Yu ............... H04W 8/005 370/328 |

OTHER PUBLICATIONS

Office Action dated Aug. 15, 2008, U.S. Appl. No. 11/405,195, filed Apr. 17 2006, 12 pages.
Final Office Action dated Feb. 26, 2009, U.S. Appl. No. 11/405,195, 17 pages.
Advisory Action dated May 7, 2009, U.S. Appl. No. 11/405,195, 2 pages.
Office Action dated Aug. 18, 2009, U.S. Appl. No. 11/405,195, 17 pages.
Final Office Action dated Oct. 27, 2010, U.S. Appl. No. 11/405,195, filed Apr. 17, 2006.
Office Action dated Feb. 8, 2011, U.S. Appl. No. 11/405,195, filed Apr. 17, 2006.
Final Office Action dated Jul. 22, 2011, U.S. Appl. No. 11/405,195, filed Apr. 17, 2006.
Advisory Action dated Oct. 14, 2011, U.S. Appl. No. 11/405,195, filed Apr. 17, 2006.
Office Action dated Apr. 6, 2012, U.S. Appl. No. 11/405,195, filed Apr. 17, 2006.
Notice of Allowance dated Dec. 6, 2012, U.S. Appl. No. 11/405,195, filed Apr. 17, 2006.
Office Action dated Feb. 27, 2009, U.S. Appl. No. 11/433,301, filed May 12, 2006, 13 pages.
Notice of Allowance dated Oct. 26, 2009, U.S. Appl. No. 11/433,301, filed May 12, 2006, 7 pages.
Notice of Allowance dated Mar. 5, 2012, U.S. Appl. No. 12/686,188, filed Jan. 12, 2010.
Office Action dated Jun. 17, 2008, U.S. Appl. No. 11/403,614, filed Apr. 13, 2006, 7 pages.
Office Action dated Aug. 27, 2008, U.S. Appl. No. 11/403,614, filed Apr. 13, 2006, 11 pages.
Final Office Action dated Mar. 4, 2009, U.S. Appl. No. 11/403,614, filed Apr. 13, 2006, 12 pages.
Advisory Action dated May 7, 2009, U.S. Appl. No. 11/403,614, filed Apr. 13, 2006, 3 pages.
Office Action dated Aug. 20, 2009, U.S. Appl. No. 11/403,614, filed Apr. 13, 2006, 11 pages.
Final Office Action dated Nov. 8, 2010, U.S. Appl. No. 11/403,614, filed Apr. 13, 2006.
Office Action dated Dec. 3, 2012, U.S. Appl. No. 11/403,614, filed Apr. 13, 2006.
Final Office Action dated Jun. 10, 2013, U.S. Appl. No. 11/403,614, filed Apr. 13, 2006.
Advisory Action dated Aug. 22, 2013, U.S. Appl. No. 11/403,614, filed Apr. 13, 2006.
Office Action dated Nov. 3, 2008, U.S. Appl. No. 11/438,540, filed May 22, 2006, 14 pages.
Final Office Action dated Apr. 28, 2009, U.S. Appl. No. 11/438,540, filed May 22, 2006, 16 pages.
Advisory Action dated Jul. 10, 2009, U.S. Appl. No. 11/438,540, filed May 22, 2006, 3 pages.
Office Action dated Oct. 16, 2009, U.S. Appl. No. 11/438,540, filed May 22, 2006, 12 pages.
Final Office Action dated Apr. 20, 2010, U.S. Appl. No. 11/438,540, filed May 22, 2006, 26 pages.
Advisory Action dated Jul. 2, 2010, U.S. Appl. No. 11/438,540, filed May 22, 2006, 4 pages.
Office Action dated Oct. 14, 2010, U.S. Appl. No. 11/438,540, filed May 22, 2006.
Final Office Action dated Mar. 30, 2011, U.S. Appl. No. 11/438,540, filed May 22, 2006.
Examiner's Answer dated Oct. 27, 2011, U.S. Appl. No. 11/438,540, filed May 22, 2006.
Office Action dated Nov. 14, 2008, U.S. Appl. No. 11/474,880, filed Jun. 26, 2006, 17 pages.
Final Office Action dated May 28, 2009, U.S. Appl. No. 11/474,880, filed Jun. 26, 2006, 23 pages.
Advisory Action dated Oct. 19, 2009, U.S. Appl. No. 11/474,880, filed Jun. 26, 2006, 4 pages.
Advisory Action (corrected) dated Oct. 27, 2009, U.S. Appl. No. 11/474,880, filed Jun. 26, 2006, 4 pages.
Office Action dated Mar. 5, 2010, U.S. Appl. No. 11/474,880, filed Jun. 26, 2006, 24 pages.
Final Office Action dated Aug. 18, 2010, U.S. Appl. No. 11/474,880, filed Jun. 26, 2006, 20 pages.
Office Action dated Mar. 30, 2011, U.S. Appl. No. 11/474,880, filed Jun. 26, 2006.
Final Office Action dated Sep. 7, 2011, U.S. Appl. No. 11/474,880, filed Jun. 26, 2006.
Advisory Action dated Nov. 15, 2011, U.S. Appl. No. 11/474,880, filed Jun. 26, 2006.
Examiner's Answer dated May 1, 2012, U.S. Appl. No. 11/474,880, filed Jun. 26, 2006.
Decision on Appeal dated Nov. 18, 2014, U.S. Appl. No. 11/474,880, filed Jun. 26, 2006.
Office Action dated Feb. 4, 2009, U.S. Appl. No. 11/491,387, filed Jul. 21, 2006, 9 pages.
Final Office Action dated Aug. 6, 2009, U.S. Appl. No. 11/491,387, filed Jul. 21, 2006, 13 pages.
Advisory Action dated Oct. 19, 2009, U.S. Appl. No. 11/491,387, filed Jul. 21, 2006, 4 pages.
Examiner's Answer dated Nov. 8, 2010, U.S. Appl. No. 11/491,387, filed Jul. 21, 2006.

(56) References Cited

OTHER PUBLICATIONS

Decision on Appeal dated Oct. 9, 2012, U.S. Appl. No. 11/491,387, filed Jul. 21, 2006.
Notice of Allowance dated Jan. 8, 2013, U.S. Appl. No. 11/491,387, filed Jul. 21, 2006.
Office Action dated Jan. 6, 2010, U.S. Appl. No. 11/558,021, filed Nov. 9, 2006, 7 pages.
Final Office Action dated Jun. 29, 2010, U.S. Appl. No. 11/558,021, filed Nov. 9, 2006, 28 pages.
Advisory Action dated Sep. 22, 2010, U.S. Appl. No. 11/558,021, filed Nov. 9, 2006, 3 pages.
Office Action dated Jun. 13, 2013, U.S. Appl. No. 11/558,021, filed Nov. 9, 2006.
Final Office Action dated Dec. 26, 2013, U.S. Appl. No. 11/558,021, filed Nov. 9, 2006.
Advisory Action dated Feb. 20, 2014, U.S. Appl. No. 11/558,021, filed Nov. 9, 2006, 3 pages.
Examiner's Answer date Aug. 26, 2014, U.S. Appl. No. 11/558,021, filed Nov. 9, 2006.
Office Action dated Aug. 30, 2010, U.S. Appl. No. 11/557,939, filed Nov. 8, 2006, 52 pages.
Final Office Action dated Jan. 13, 2011, U.S. Appl. No. 11/557,939, filed Nov. 8, 2006.
Advisory Action dated Mar. 22, 2011, U.S. Appl. No. 11/557,939, filed Nov. 8, 2006.
Office Action dated Oct. 31, 2013, U.S. Appl. No. 11/557,939, filed Nov. 8, 2006.
Office Action date Aug. 5, 2014, U.S. Appl. No. 11/557,939, filed Nov. 8, 2006.
Office Action dated Sep. 30, 2010, U.S. Appl. No. 11/617,703, filed Dec. 28, 2006.
Final Office Action dated Mar. 25, 2011, U.S. Appl. No. 11/617,703, filed Dec. 28, 2006.
Advisory Action dated Jun. 7, 2011, U.S. Appl. No. 11/617,703, filed Dec. 28, 2006.
Notice of Allowance dated Aug. 1, 2012, U.S. Appl. No. 11/617,703, filed Dec. 28, 2006.
Office Action dated Jul. 21, 2011, U.S. Appl. No. 12/259,187, filed Oct. 27, 2008.
Final Office Action dated Dec. 12, 2011, U.S. Appl. No. 12/259,187, filed Oct. 27, 2008.
Advisory Action dated Feb. 29, 2012, U.S. Appl. No. 12/259,187, filed Oct. 27, 2008.
Office Action dated Dec. 6, 2013, U.S. Appl. No. 12/259,187, filed Oct. 27, 2008.
Final Office Action dated May 27, 2014, U.S. Appl. No. 12/259,187, filed Oct. 27, 2008.
Advisory Action dated Aug. 6, 2014, U.S. Appl. No. 12/259,187, filed Oct. 27, 2008.
Lightningcast, Inc., "Lightningcast Mobile Video Advertising Solution," May 2, 2005, 14 pgs.
Connelly, Francis J., et al., "The Life Cycle Concept as a Long Term Forecasting Model", Academy of Marketing Journal (pre-1986); pp. 455-464, Summer 1974, 2, 3, ABI/INFORM Global.
Fisher, Marshall, et al., Accurate Retail Testing of Fashion Mechandise: Methodology and Application, Marketing Science, vol. 19, No. 3, pp. 266-278, Summer 2000, ABI/INFORM Global.
Kurawarwala, Abbas A., et al., "Forecasting and Inventory Management of Short Life-Cyle Products", Operations Research, vol. 44, No. 1, Jan.-Feb. 1996, pp. 131-150, INFORMS.
Stratman, Scott, "Allstockedup", Industrial Distribution, vol. 89, No. 11, Nov. 2000, pp. 92-96, ABI/INFORM Global.
Vijayan, Jaikumar, "IBM Service Follows Products After Delivery", Computerworld, vol. 35, No. 28, p. 14, Jul. 9, 2001, ABI/INFORM Global.
Sterling, Greg, "Google Replacing "Android ID" with"Advertising ID" Similar to Apple's IDFA," http://marketingland.com/google-replacing-android-id-with-advertising-id-similar-to-apples-idfa-63636, posted Oct. 31, 2013.
Janssen, Cory, "Identifier for Advertisers (IFA)," http://www.techopedia.com/definition/29032/identifier-for-advertisers-ifa-ifda, Apr. 3, 2014, last accessed Feb. 10, 2015.
The iPhone Wiki, "UDID," http://theiphonewiki.com/wiki/UDID, Apr. 3, 2014, last accessed Feb. 10, 2015.
Google Developer Android, "Advertising ID," http://developer.android.com/google/play-services/id.html, Apr. 3, 2014, last accessed Feb. 10, 2015.
Wikipedia, "Real-time Bidding," http://en.wikipedia.org/wiki/Real-time_bidding, Apr. 3, 2014, last accessed Feb. 10, 2015.
Reynolds, Kevin, "Are Ad Exchanges and Real Time Bidding the Next Big Thing?," http://www.advertisingperspectives.com/adblog/media-activation/are-ad-exchanges-and-real-time-bidding-the-next-big-thing/, Apr. 3, 2014, last accessed Feb. 10, 2015.
Foreign Communication from a Related Counterpart—International Search Report and Written Opinion, dated Dec. 24, 2014, PCT/US14/54877, filed on Nov. 11, 2014.
Barnes, James D., et al., entitled, "Systems and Methods for State-Based Advertisement Messaging Across Media Types," filed May 22, 2006, U.S. Appl. No. 11/438,540.
Barnes, James D., et al., entitled, "In-Flight Campaign Optimization," filed Nov. 9, 2006, U.S. Appl. No. 11/558,021.
Barnes, James D., et al., entitled "Mobile-Device-Based Coupon Management Systems and Methods," filed Apr. 13, 2006, U.S. Appl. No. 11/403,614.
Barnes, James D., et al., entitled, "Inventory Management Integrating Subscriber and Targeting Data," Jun. 26, 2006, U.S. Appl. No. 11/474,880.
Barnes, James D., et al., entitled, "Behavioral Analysis Engine for Profiling Wireless Subscribers," filed Nov. 8, 2006, U.S. Appl. No. 11/557,939.
Barnes, James D., et al., entitled, "Advertisement Inventory Management," filed Oct. 27, 2008, U.S. Appl. No. 12/259,187.
Martin, Geoff S., et al., entitled, "Method and System for Providing Custom Background-Downloads," filed Nov. 16, 2007, U.S. Appl. No. 11/280,576.
McConnell, Von K. et al., entitled, "Method and System Using Location History for Targeted Coupon Distribution," filed May 17, 2000, U.S. Appl. No. 09/572,282.
Weaver, Farni, et al., "Method and System for Facilitating Determination of Call-Drop Locations in a Wireless Network," filed Sep. 9, 2003, U.S. Appl. No. 10/658,353.
Burcham, Robert H., et al., entitled "System and Method to Generate an Abstract Advertisement Campaign Management and Implement Policy Enforcement," filed Sep. 11, 2013, U.S. Appl. No. 14/024,629.
Burcham, Robert H., et al., entitled "System and Method to Generate an Abstract Advertisement Campaign Management and Implement Policy Enforcement," filed Sep. 10, 2014, PCT Application Serial No. PCT/US2014/054877.
Burcham, Robert H., et al., entitled "Methods and Systems of Generating a Unique Mobile Device Identifier," filed Aug. 1, 2013, U.S. Appl. No. 13/956,367.
Holmes, Geoffrey A., entitled "Methods and Systems of Collecting and Segmenting Device Sensor Data for Mobile Device Identification," filed Jun. 5, 2013, U.S. Appl. No. 13/911,074.
Belser, John E., et al., entitled "Ad Management Using Ads Cached on a Mobile Electronic Device," filed Jan. 9, 2014, U.S. Appl. No. 14/150,832.
Katzer, Robin D., et al., entitled "Advertisement Dynamic Queue Management," filed Apr. 10, 2014, U.S. Appl. No. 14/250,381.
Burcham, Robert H., et al., entitled "Categorization of Unknown Variables in a Target Information Database," filed Nov. 4, 2014, U.S. Appl. No. 14/532,969.
Bell, Timothy L., et al., entitled "Method for Consumer Profile Consolidation Using Mobile Network Identification," filed Oct. 20, 2014, U.S. Appl. No. 14/518,504.
Arivukkarasu, Anand, et al., entitled "Telecom Services to Support Retail Fuel Stocking Logistics," filed Nov. 12, 2014, U.S. Appl. No. 14/539,715.
Decision on Appeal dated Apr. 28, 2015, U.S. Appl. No. 11/438,540, filed May 22, 2006.

(56) References Cited

OTHER PUBLICATIONS

Office Action dated Feb. 25, 2015, U.S. Appl. No. 11/474,880, filed Jun. 26, 2006.
Final Office Action date Mar. 2, 2015, U.S. Appl. No. 11/557,939, filed Nov. 8, 2006.
Examiner's Answer dated Mar. 12, 2015, U.S. Appl. No. 12/259,187, filed Oct. 27, 2008.
FAIPP Pre-Interview Communication dated Apr. 3, 2015, U.S. Appl. No. 14/150,832, filed Jan. 9, 2014.
Thierer, et al., "Privacy Solutions (Part 2): Adblock Plus," Technology Liberation Front, Sep. 8, 2008, on line at techliberation.com.
Burcham, Robert H., et al., entitled "IP Address Hashing in Advertisement Gateway," filed Jan. 21, 2014, U.S. Appl. No. 14/160,196.
Burcham, Robert H., et al., entitled "Client Mediation and Integration to Advertisement Gateway," filed Jan. 21, 2014, U.S. Appl. No. 14/160,206.
Burcham, Robert H., et al., entitled "Address Modification for Advertisement Mediation," filed Jan. 21, 2014, U.S. Appl. No. 14/160,215.
Burcham, Robert H., et al., entitled "Advertisement Mediation of Supply-Demand Communications," filed Jan. 21, 2014, U.S. Appl. No. 14/160,224.
Delker, Jason R., et al., entitled, "Enhanced Dialer for a Mobile Communication Device," filed Mar. 4, 2015, U.S. Appl. No. 14/639,057.
Ferrante, Piero D., et al., entitled, "System and Method for Subscriber Cluster Synthesis," filed Feb. 11, 2015, U.S. Appl. No. 14/619,689.
Notice of Allowance dated Jul. 16, 2015, U.S. Appl. No. 11/438,540, filed May 22, 2006.
Final Office Action dated Aug. 31, 2015, U.S. Appl. No. 11/474,880, filed Jun. 26, 2006.
FAIPP Pre-Interview Communication dated Sep. 23, 2015, U.S. Appl. No. 13/956,367, filed Aug. 1, 2013.
FAIPP Office Action dated Jul. 2, 2015, U.S. Appl. No. 14/150,832, filed Jan. 9, 2014.
FAIPP Pre-Interview Communication dated Sep. 18, 2015, U.S. Appl. No. 14/494,601, filed Sep. 24, 2014.
Wikipedia, "Foursuare," https://en.wikipedia.org/w/index.php?title=Foursquare&oldid=681836736, Mar. 2009, last accessed on Sep. 25, 2015.
Belser, John E., et al., entitled "End User Participation in Mobile Advertisement," filed Sep. 24, 2014, U.S. Appl. No. 14/494,601.
Advisory Action dated Oct. 29, 2015, U.S. Appl. No. 11/474,880, filed Jun. 26, 2006.
Supplemental Advisory Action dated Nov. 2, 2015, U.S. Appl. No. 11/474,880, filed Jun. 26, 2006.
Advisory Action date May 18, 2015, U.S. Appl. No. 11/557,939, filed Nov. 8, 2006.
Office Action date Dec. 17, 2015, U.S. Appl. No. 11/557,939, filed Nov. 8, 2006.
FAIPP Pre-Interview Communication dated Nov. 18, 2015, U.S. Appl. No. 14/024,629, filed Sep. 11, 2013.
Notice of Allowance dated Dec. 16, 2015, U.S. Appl. No. 13/956,367, filed Aug. 1, 2013.
Final Office Action dated Oct. 29, 2015, U.S. Appl. No. 14/150,832, filed Jan. 9, 2014.
Advisory Action dated Jan. 7, 2016, U.S. Appl. No. 14/150,832, filed Jan. 9, 2014.
First Action Interview Office Action dated Dec. 17, 2015, U.S. Appl. No. 14/494,601, filed Sep. 24, 2014.
Notice of Allowance dated Jan. 28, 2016, U.S. Appl. No. 14/024,629, filed Sep. 11, 2013.
FAIPP Pre-Interview Communication dated Apr. 15, 2016, U.S. Appl. No. 13/911,074, filed Jun. 5, 2013.
FAIPP Pre-Interview Communication dated Feb. 16, 2016, U.S. Appl. No. 14/245,822, filed Apr. 4, 2014.
Foreign Communication from a Related Counterpart—Preliminary Report on Patentability dated Mar. 24, 2016, PCT/US14/54877, filed on Sep. 10, 2014.
Hannebaum, Ryan K., et al., entitled, "Advertisement Campaign Target Selection Engine," filed Apr. 4, 2014, U.S. Appl. No. 14/245,822.
Final Office Action dated May 3, 2016, U.S. Appl. No. 11/557,939, filed Nov. 8, 2006.
Office Action dated May 17, 2016, U.S. Appl. No. 14/150,832, filed Jan. 9, 2014.
First Action Interview Office Action dated Apr. 28, 2016, U.S. Appl. No. 14/245,822, filed Apr. 4, 2014.
Office Action dated Jul. 1, 2016, U.S. Appl. No. 14/165,569, filed Jan. 27, 2014.
Office Action dated Jul. 14, 2016, U.S. Appl. No. 14/165,571, filed Jan. 27, 2014.
Final Office Action dated Apr. 28, 2016, U.S. Appl. No. 14/494,601, filed Sep. 24, 2014.
Notice of Allowance dated Jul. 22, 2016, U.S. Appl. No. 14/494,601, filed Sep. 24, 2014.
Burcham, Robert H., et al., entitled "Swipe Screen Advertisement Metrics and Tracking," filed Nov. 27, 2013, U.S. Appl. No. 61/910,001.
Burcham, Robert H., et al., entitled "Swipe Screen Advertisement Metrics and Tracking," filed Jan. 27, 2014, U.S. Appl. No. 14/165,569.
Delker, Jason R., et al., entitled "Ad Management Using Ads Cached on a Mobile Electronic Device," filed Nov. 27, 2013, U.S. Appl. No. 61/910,002.
Delker, Jason R., et al., entitled "Ad Management Using Ads Cached on a Mobile Electronic Device," filed Jan. 27, 2014, U.S. Appl. No. 14/165,571.
Examiner's Answer dated Nov. 2, 2016, Application Serial No. 11/474,880 tiled on Jun. 26, 2006 IDF 3887 (4000-43100).
Final Office Action dated Oct. 14, 2016, U.S. Appl. No. 14/150,832, filed on Jan. 9, 2014 [IDF 9600 (4300-39500)].
Barnes, James D., et al., entitled, "Behavioral Analysis Engine for Profiling Wireless Subscribers," filed Aug. 3, 2016, U.S. Appl. No. 15/227,950. [IDF 3957A (4000-45301)].

* cited by examiner

SYSTEM AND METHOD FOR IDENTIFYING A MOBILE DEVICE WITH NEAR REAL TIME VISUALIZATION TO ACTION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Data may be collected about consumers to provide targeted information and/or message(s) to the consumers based on the collected data. A marketer may select parameters which parse people into categories or characteristics, so that when marketing a particular product and/or service, consumers most likely to show interest in the product and/or service may be exclusively reached. The targeted information and/or message(s) may be transmitted to the parsed consumers through one or more channels.

SUMMARY

A message distribution system for distributing messages to qualified mobile devices is disclosed. The system comprises an analytics system configured to identify one or more mobile devices associated with one or more qualifiers, wherein the one or more qualifiers comprises at least one characteristic associated with at least one of a mobile device, a mobile device user, or a mobile device owner, generate a list of one or more mobile devices based on the association with the one or more qualifiers, and transmit the list of one or more mobile device to a data visualization system. The system further comprises the data visualization system configured to identify that one or more mobile devices from the list of one or more mobile devices is located at a selected geographic area and transmit a list and generates a graphical image of one or more mobile device located at a selected geographic area and associated with one or more qualifiers, wherein the one or more qualifiers comprises at least one characteristic associated with at least one of a mobile device, a mobile device user, or a mobile device owner. The system also comprises a common campaign system configured to transmit the one or more qualifiers to at least the analytics system to identify the one or more mobile devices associated with the one or more qualifiers, receive the list of one or more mobile devices located at a selected geographic area and associated with one or more qualifiers, and send a message to the one or more mobile devices on the list of one or more mobile devices located at a selected geographic area and associated with one or more qualifiers.

A method of targeting one or more mobile devices with a message is disclosed. The method comprises identifying one or more mobile devices associated with one or more qualifiers, wherein the one or more qualifiers comprises at least one characteristic associated with at least one of a mobile device, a mobile device user, or a mobile device owner. The method further comprises identifying that one or more mobile devices of the one or more mobile devices associated with the one or more qualifiers is located in a selected geographic area. The method also comprises generating a list and a graphical image of the one or more mobile devices located in the selected geographic area and associated with the one or more qualifiers. The method comprises transmitting a message to the one or more mobile devices from the list of the one or more mobile devices, wherein at least one of the mobile devices from the list of the one or more mobile devices is located in the selected geographic area when the message is transmitted.

A method of identifying a set of one or more mobile devices for targeted messaging is disclosed. The method comprises identifying one or more mobile devices associated with one or more qualifiers. The method further comprises identifying that one or more mobile devices of the one or more mobile devices associated with the one or more qualifiers is located in a selected geographic area. The method also comprises providing an estimate of the number of mobile devices which may be associated with one or more qualifiers and may be located in the selected geographic location at a future time.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
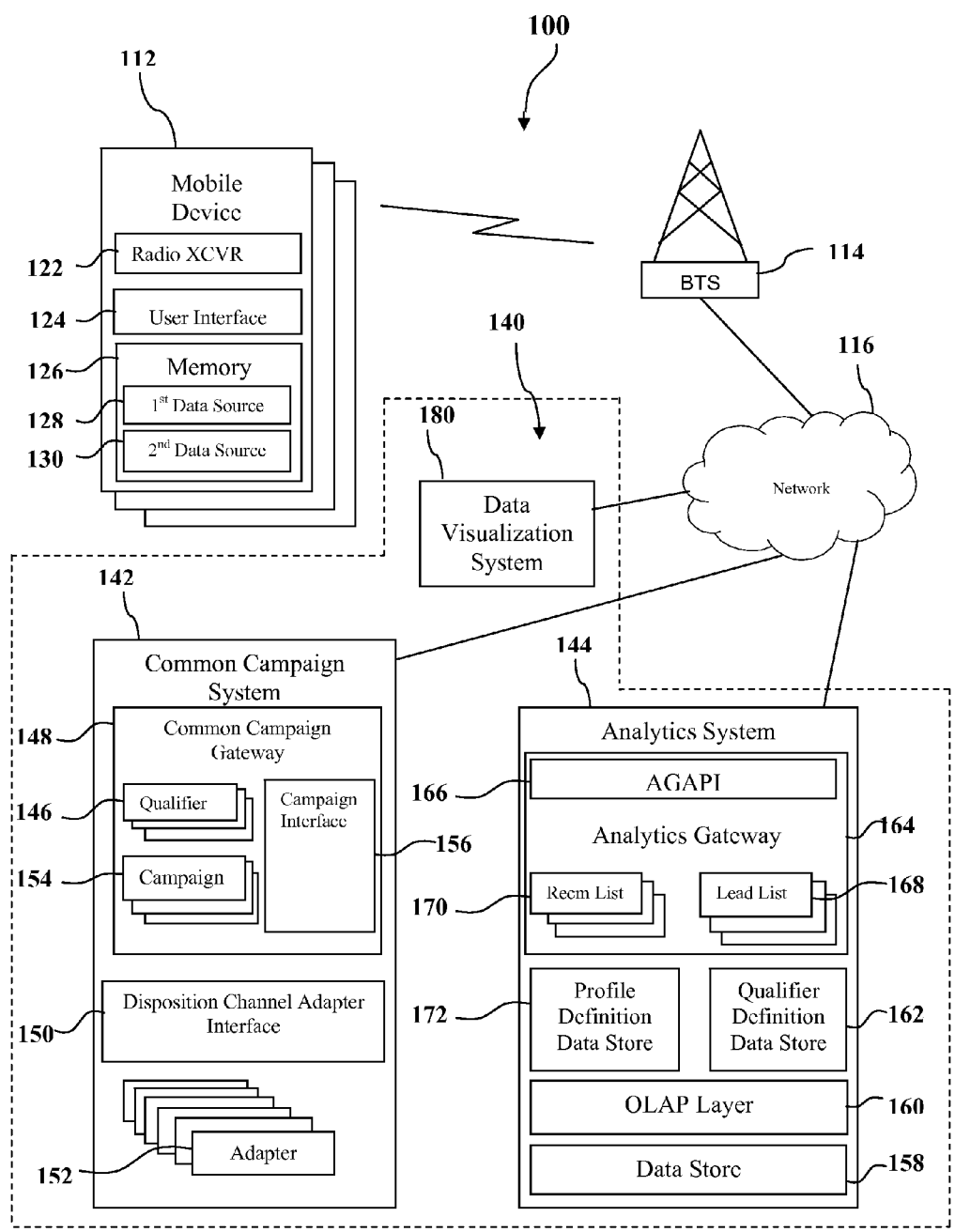
FIG. 1 is a block diagram of a provisioning system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A system for initiating a marketing campaign utilizes a core system comprising a common campaign system, an analytics system, and a data visualization system. A marketer, for example, representing a small privately owned department store, may wish to market a new clothing line in the store to individuals who may be more likely than other individuals to purchase an item from the new clothing line.

Individuals with mobile device(s) may be constantly interacting with their mobile device(s) which may reflect the behavior patterns, interests, characteristics, and/or the like of the individual(s). The interactions may be recorded, transmitted, and stored in a data base. The marketer may select one or more qualifier(s) through the common campaign system to target owners and/or users of mobile device(s) with one or more messages associated with the selected qualifier(s). A qualifier may comprise either actual or inferred information related to age, gender, race, socio-economic status, food preference, product and/or service purchase history, hobbies, geographic location, behavior patterns, mobile service providers, type of mobile device(s) used, and/or the like. Qualifier(s) may also comprise one criterion or multiple criteria and/or one or more characteristics related the mobile device, a user of the mobile device, and/or an owner of the mobile device. The analytics system may identify one or more mobile device(s) associated with the selected one or more qualifier(s) based on the stored interactions. The system utilizes data gathered through interactions between a mobile device and an owner and/or user of the mobile device so that a marketer may transmit targeted information to mobile device(s) cheaply, effectively, and in near real time.

In an embodiment, transmitting targeted information to the mobile devices in near real time may comprise transmitting the targeted information in less than about one minute, less than about 3 minutes, less than about 5 minutes, less than about 10 minutes, less than about 20 minutes, or some other time. For example, the system may detect or select one or more mobile devices based on one or more qualifiers and transmit a message to each of the mobile device(s) within about 3 minutes after detecting the one or more mobile devices. In an embodiment, in near real time may comprise a reasonable amount of time between detecting or selecting one or more mobile device(s) in a specific geographic area and/or associated with one or more qualifiers and transmitting a message to a reasonable amount of the detected mobile devices to entice the owner's and/or users of the mobile devices to act based on the transmitted message. For example, the system may detect that a quantity of mobile devices may be outside a department store which are associated with one or more qualifiers. The system may send messages to the mobile device in near real time so that a reasonable amount of owners and/or users of the mobile devices may be at a convenient location to access the department store. A convenient location may comprise a specific location, within about 10 feet of the specific location, within about 50 feet of the specific location, within about 100 feet of the specific location, within about 250 of the specific location, within about 500 feet of the specific location, within about 1000 feet of the specific location, within about 2500 feet of the specific location, within about one mile of the specific location, within about 5 miles of the specific location, and/or the like. In an embodiment, in near real time may comprise identifying one or more mobile device(s) associated with one or more qualifier(s) and/or located in a selected geographic area and providing a message after identifying the mobile device(s) to at least one of the identified mobile device(s) which still is associated at least one the qualifier(s) and/or the selected geographic area.

The marketer may also want to identify owners and/or users of mobile device(s) who are associated with the one or more selected qualifier(s) who are located in a selected geographic area, for example within a distance from the department store. The marketer may identify a selected geographic area through the common campaign system and send this parameter (e.g. qualifier) to the data visualization system. The data visualization system may locate one or more mobile device(s) associated with the selected qualifier(s) in the selected geographic area. In near real time, the data visualization system may transmit information to the common campaign system to be presented to the marketer such as a current estimate of the number of mobile device(s) associated with qualifier(s) and in the selected geographic area, a map of all the mobile device(s) associated with qualifier(s) in and/or out of the selected geographic area, and/or a history of when mobile device(s) associated with one or more qualifier(s) were located in the selected geographic area. The marketer may transmit one or more message(s) through the common campaign system based on one or more of the information transmitted and/or the qualifier(s). Thus, a marketer may utilize the system to instantaneously target likely customers, through their mobile device(s), located in close proximity to the marketer's department, for example, to entice individuals walking by the department store to enter the department store. For some more details on analytics and common campaign services, see U.S. patent application Ser. No. 14/024,629, filed on Sep. 11, 2013, entitled "System and Method Distributing Messages to Particular Mobile Devices," by Robert H. Burcham, et al. which is incorporated by reference in its entirety.

Turning now to FIG. 1, a communication system 100 is described. The system 100 comprises one or more of mobile device(s) 112, a base transceiver station (BTS) 114, a network 116, and a core system 140. The mobile device 112 may be a mobile phone, a personal digital assistant (PDA), a media player, or other communication enabled portable electronic device. In an embodiment, the mobile device 112 may be implemented as a handset. Details of handsets are discussed further hereinafter. The base transceiver station 114 provides a wireless communication link to the mobile device 112 and couples the mobile device 112 to the network 116. In an embodiment, the base transceiver station 114 provides a wireless communication link to the mobile device 112 according to one or more of a code division multiple access (CDMA) wireless protocol, a global system for mobile communications (GSM) wireless protocol, a long term evolution (LTE) wireless protocol, a worldwide interoperability for microwave access (WiMAX) wireless protocol, or another wireless protocol. While a single base transceiver station 114 is illustrated in FIG. 1, it is understood that the communication system 100 may comprise any number of base transceiver stations 114 and any number of mobile devices 112. The network 116 may be a public communication network, a private communication network, or a combination thereof.

The mobile device(s) 112 may comprise a radio transceiver 122, a first user interface 124, and a memory 126. Alternatively, the mobile device 112 may comprise two or more radio transceivers 122 and/or two or more memories 126. The memory 126 may store at least one data source, such as a first data source 128 and/or a second data source 130. In an embodiment, the memory 126 of the mobile device 112 may store two or more data sources. A data source may comprise an electronic wallet, a mobile device location identifier, one or more applications on a mobile device 112, a data store storing profile information about the mobile device (e.g. owner(s) and/or user(s) of a mobile device 112), a Zone Media Service (ZMS) application, and/or the like.

A data source may record information related to one or more events between a mobile device user and a mobile device 112 and convert the recorded information into raw data. For example, a data source associated with determining a location of the mobile device 112 may record information related to an event which may comprise that a mobile device 112 was at a selected location at a selected time of day, that a particular transaction was made using an electronic wallet on the mobile device 112 to purchase a particular product and/or to purchase at a particular store, a series of repetitive mobile device movements, how and/or when a mobile device user prefers to be contacted or reached for messages, the use of one or more features on the mobile device 112, the frequency and/or subject of customer service calls, any combination thereof, and/or the like.

In an embodiment, as will be discussed further herein, the data source(s) may be configured to transmit raw data as well as metadata based on the recorded information to an analytics system 144. In an embodiment, while FIG. 1 illustrates that data source(s) 128 and 130 are located in the memory 126 of the mobile device 112, the data source(s) 128 and 130 may be located remotely from the mobile device 112 (e.g. a remote server) but may receive one or more signals from a particular mobile device 112 so that the data source(s) located at the remote location may transmit raw data and metadata based on the recorded information to the analytics system 144.

The core system 140 may be configured to categorize one or more mobile devices 112 into one or more selected categories based on at least recorded information provided by one or more data source(s). The core system 140 may also be configured to gather an identification associated with the one or more mobile device(s) 112 based on the one or more selected categories and allow a marketer to transmit one or more message(s) to the one or more mobile device(s) related to the one or more categories.

For example, core system 140 may receive recorded information from two mobile devices 112 indicating that both mobile devices used an electronic wallet at ABC Department Store to purchase Acme walking shoes. One or more data source(s) on each mobile device 112 may store a record of one or more aspects of the purchase of the Acme walking shoes using the electronic wallet at ABC Department Store. Each record may be transmitted to the core system 140 so that each mobile device 112 (and thus the mobile device user) may be categorized as having used the electronic wallet, having purchased an item at ABC Department Store, having purchased Acme walking shoes, any combination thereof, and/or the like.

The core system 140 may then gather identifications for both mobile devices 112 when a marketer looks for a list of mobile devices (and thus mobile device users) who have purchased an item at ABC Department Store. The core system 140 may then provide the marketer with the ability to transmit a message to both mobile devices 112. The message may be related to ABC Department Store, the message may be related to another department store like ABC Department Store, the message may be based on an inference generated using heuristics of people who purchase at ABC Department Store, any combination thereof, and/or the like. In an embodiment, the message may comprise a link to another message such that when the user of mobile device 112 selects the link, the selection of the link becomes another event stored in a data source.

Generally, the core system 140 may comprise a common campaign system 142, an analytics system 144, and a data visualization system 180. The common campaign system 142 may be configured to transmit one or more messages to one or more mobile devices 112. For example, a marketer may wish to market a new line of neckties for XYZ Department Store. Through the common campaign system 142, the marketer may select one or more qualifiers 146 which the marketer believes may provide one or more categories of mobile device users who are likely to purchase neckties. Qualifiers 146 may comprise either actual or inferred information related to age, gender, race, socio-economic status, food preference, product and/or service purchase history, hobbies, geographic location, behavior patterns, mobile service providers, type of mobile device(s) used, and/or the like. A qualifier may be a category or dimension of information. A qualifier may be defined as a range of valid values of a data field or data parameter, for example the age range from 23 to 27 years old, the income range of $70,000 to $80,000 annual income. In some contexts, qualifiers may alternatively be referred to as criteria.

After selecting one or more qualifier(s) 146, the common campaign system 142 may transmit a signal to the analytics system 144 to obtain an address to each mobile device(s) 112 associated with potential customers who are likely to purchase neckties. The marketer may provide one or more message(s) to the common campaign system 142, for example, advertising the new line of neckties. The common campaign system 142 may then transmit the message(s) to the mobile device(s) 112 identified by the analytics system 144. The message(s) may be pushed to the mobile device(s) 112 and/or the message(s) may be sent to a queue while the mobile device(s) 112 are notified of the message(s) which are to be pulled by the mobile device(s) 112. In an embodiment, while one or more addresses to the mobile device(s) may be provided to the common campaign system 142, the marketer may not have access to the addresses and thus may be unable to identify the individuals associated with the mobile device(s) 112 receiving message(s). Thus, when transmitting one or more message(s), the common campaign system 142 may only identify how many mobile device(s) 112 are/were transmitted message(s).

As described in the previous example, the common campaign system 142 may be configured to provide one or more qualifiers 146 to a marketer so that the marketer may select one or more qualifiers 146 to transmit one or more message(s) to mobile device(s) 112 associated with the selected qualifier(s). As previously discussed, qualifiers 146 may comprise either actual or inferred information related to age, gender, race, socio-economic status, food preference, product and/or service purchase history, hobbies, geographic location, behavior patterns, mobile service providers, type of mobile device(s) used, and/or the like.

For example, a marketer for ABC Department Store may want to transmit advertisements to likely customers through the likely customers' mobile device(s) 112 for a new women's purse. The common campaign system 142 may provide a plurality of qualifier(s) 146 to the ABC Department Store marketer so that the marketer may choose one or more qualifiers of the plurality of qualifier(s) 146 to transmit one or more message(s) to owners and/or users of mobile devices associated with those qualifiers 146. For example, the ABC Department Store marketer may select a "women" qualifier (i.e. mobile devices owned and/or used by females) as well as the "25-65 year old demographic" qualifier (i.e. mobile devices owned and/or used by people between the ages of 25 and 65) of the plurality of qualifiers presented by the common campaign system 142.

The common campaign system 142 may transmit a signal to the analytics system 144 requesting the addresses of mobile device owners and/or users associated with either and/or both those two qualifiers selected by the marketer. In an embodiment, the common campaign system 142 may store the qualifier(s) 146 in a common campaign gateway 148 (to be discussed further herein) and/or the common campaign system 142 may obtain the qualifier(s) 146 from the analytics system 144.

The common campaign system 142 may comprise a common campaign gateway 148, a disposition channel adapter interface 150, and one or more adapters 152. The common campaign gateway 148 may be configured to provide a marketer with qualifier(s) 146 so that a marketer may initiate one or more campaign(s) 154 to transmit messages to one or more mobile device owners and/or users through their mobile device(s) 112 (e.g. mobile device owners and/or users who are likely to be interested in what the marketer is marketing). The common campaign gateway 148 may provide qualifier(s) 146 to marketer(s) through a campaign interface 156. The marketer may select one or more qualifier(s) 146 and initiate one or more campaign(s) 154 through the common campaign gateway 148.

For example, after selecting the "women" qualifier and the "25-65 year old demographic" qualifier, the common campaign gateway 148 may transmit a message to the analytics system 144 requesting an address for each mobile device associated with those qualifier(s). Once the analytics system 144 transmits the mobile device addresses to the common campaign gateway 148, the ABC Department Store marketer may provide an advertisement and/or message to the common campaign gateway 148 through the campaign interface 156 and instruct the common campaign gateway 148 to initiate a campaign 154.

Campaign(s) 154 may generally comprise transmitting one or more message(s) to one or more mobile device(s) 112, where the selection of the mobile devices 112 are based on the selection of the one or more qualifier(s) 146. Based on the parameters specified through selecting the qualifier(s) 146 and implemented by the marketer to initiate a campaign 154, the common campaign gateway 148 may transmit one or more message(s) to one or more mobile device(s) 112 related to the qualifier(s) 146 with a specified frequency, for a specified number of message(s), for a specified period of time, and/or to a percentage of all the mobile devices 112 identified by the analytics system 144 which are related to the qualifiers 146.

In addition to initiating a campaign, the common campaign gateway 148 may be configured to provide campaign information to a marketer before, during, and/or after a campaign is launched. In an embodiment, the common campaign gateway 148 may be configured to communicate with the analytics system 144 to obtain an estimate for the marketer about how many owners and/or users of mobile device(s) 112 may be associated with one or more selected qualifiers 146 before a campaign in initiated.

For example, the analytics system 144 may be continuously receiving data from mobile device(s) 112 which may be categorized based on the raw data and/or heuristics used to interpret the raw data as will be discussed further herein. A marketer for ABC Department Store may chose the "women" qualifier and the "25-65 year old demographic" qualifier through the campaign interface 156 to target the largest amount of mobile device owners and/or users most likely to buy the new line of women's purses. The marketer may initiate an inquiry using the selected qualifiers to determine the quantity of mobile device owners and/or users who may be associated with the selected qualifiers. The common campaign gateway 148 may communicate with the analytics system 144 to obtain an estimate identifying about how many mobile device owners and/or users are associated with either one of the selected qualifiers and/or both selected qualifiers.

As will be discussed further herein, the analytics system 144 may provide an estimate to the common campaign gateway 148 and thus the marketer regarding how many mobile device owners and/or users are associated with the selected qualifier(s) 146. Thus, even though the marketer may only have an estimate indicating how many mobile device owners and/or user are identified, the estimate, compared with one or more different estimates using a different combination of one or more qualifier(s) 146, may provide a marketer with a reasonable indication of which qualifiers identify the most mobile device owners and/or users likely to purchase the new line of purses.

In an embodiment, the estimate may comprise a minimum and/or maximum quantity of mobile device owners and/or users (e.g. a range) who are associated with one or more selected qualifiers over a period of time, an average quantity of mobile device owners and/or users (e.g. a mean) who are associated with one or more selected qualifiers over a period of time, the most frequent quantity of mobile device owners and/or users (e.g. a mode) who are associated with one or more selected qualifiers over a period of time, the quantity of mobile device owners and/or users which is in the middle of a list of recorded quantities of mobile device owners and/or users (e.g. a median number) associated with one more qualifiers over a period of time, the exact quantity of mobile device owners and/or users identified at the time of the inquiry (which may be different when the actual campaign is launched), a combination thereof, and/or the like.

For example, the marketer may make an inquiry to find out about how many mobile device owners and/or users may be associate with the "women" qualifier and the "25-65 year old demographic" qualifier. After communicating with the analytics system 144, the common campaign gateway 148 may inform the marketer that an average of 2500 mobile device owners and/or users over the past 2 weeks may be associated with the selected qualifiers. While the marketer may feel that this quantity is favorable, the cost of sending one or more messages to that many mobile devices may be too high. Thus, the marketer may make another inquiry adding the qualifier of mobile device owners and/or users within a two mile radius of ABC Department Store. After communicating again with the analytics system 144, the common campaign gateway 148 may inform the marketer that an average of 500 mobile device owners and/or users over the past 2 weeks may be associated with the selected qualifiers. The marketer may feel that this quantity is too low and that while ABC Department Store may be able to afford to send one or more messages to about 500 mobile device owners and/or users, ABC Department Store desires to target more potential customers.

Thus, once again the marketer may select a separate set of qualifiers comprising "married men" and "30-55 year old demographic" and make an inquiry to find out how may mobile device owners and/or users may be associated with "married men" and "30-55 year old demographic" qualifiers. Once again, after communicating with the analytics system 144, the common campaign gateway 148 may inform the marketer that an average of 500 mobile device owners and/or users over the past 2 weeks may be associated with the new selected qualifiers. The marketer may believe that about 1000 mobile device owners and/or users may be an adequate quantity of targeted likely customers while staying with ABC Department Store's budget. Thus, based on those sets of qualifiers, the marketer may initiate a campaign to send message concerning the new line of women's purses.

In an embodiment, after the marketer makes an inquiry to obtain an estimate about how many mobile device(s) 112 may have one or more message(s) transmitted to them, the campaign interface 156 may provide an estimate about how much initiating a campaign 154 with the selected qualifier(s) 146 may cost. In an embodiment, the cost may vary based on the number of total message(s) sent, the number of rounds of messages sent, the duration of the campaign, the frequencies of messages sent, and/or the like.

In an embodiment, the common campaign gateway 148 may be configured to provide campaign information to a marketer during, and/or after a campaign is launched. For example, the analytics system 144 may be continuously receiving data from mobile device(s) 112 which may be categorized based on the raw data and/or heuristics used to interpret the raw data as will be discussed further herein. A marketer for ABC Department Store may chose the "women" qualifier and the "25-65 year old demographic" qualifier through the campaign interface 156 to target the largest amount of mobile device owners and/or users most likely to buy the new line of women's purses. The marketer may have also initiated a campaign using the selected qualifiers to provide mobile device owners and/or users who may be associated with the selected qualifiers one or more messages. In an embodiment, the campaign may comprise one or more rounds of messages transmitted to the mobile device owners and/or users associated with the selected qualifiers.

For example, the marketer for ABC Department Store may have initiated a campaign comprising at least 3 rounds of messages to be transmitted to mobile device owners and/or users associated with the selected qualifier(s) of "women" and a "25-65 year old demographic." The analytics system 144 may have identified 1042 mobile devices associated with "women" and with "25-65 year old demographic" for the first round of messages. Subsequently, ABC Department Store may have sold 100 purses from the new line of purses. Additionally, the analytics system 144 may have received a record identifying that 47 of the 1042 mobile devices purchased one or more purses of the new line of purses from the ABC Department Store through an electronic wallet. The analytics system 144 may have also received a record identifying that 15 of the 1042 mobile devices purchased a different purse at ABC Department Store through an electronic wallet while 17 of the 1042 mobile devices purchased a purse at a store other than ABC Department Store through an electronic wallet. The analytics system 144 may also receive a record that 36 married men between the ages of 30 and 55 purchased one or more purses from the new line of purses at ABC Department Store through an electronic wallet. The records may be transmitted to the common campaign system 142 and displayed through the campaign interface 156 so that the marketer may see the results from the first round of messages.

The common campaign gateway 148 may be configured to allow a marketer to modify a campaign 154 during the campaign 154 as well as add new qualifier(s) 146 to the campaign 154 during the campaign 154 and/or remove qualifier(s) 146 from the campaign during the campaign in response to information provided to the marketer through the campaign gateway 156 associated with, for example, which, how many, and/or how mobile device owners and/or users responded to one or more of the messages. For example, the marketer may receive information related to the first round of messages and identify that out of the 100 purses sold after transmitting the first round of messages that 36 married men between the ages of 30 and 55 purchased one or more purses from the new line of purses at ABC Department Store through an electronic wallet. Furthermore, the marketer may also determine that the 47 mobile devices that purchased one or more purses of the new line of purses from the ABC Department Store through an electronic wallet is a sufficient amount of mobile device owners and/or users associated the qualifiers of "women" and the "25-65 year old demographic" with 1042 total messages sent. Thus, the marketer may wish to modify the campaign. The marketer may wish to reduce the number of mobile devices associated with the qualifiers 146 of "women" and the "25-65 year old demographic" by 50% which receive messages during the second round. The marketer may also wish to send messages to mobile devices 112 associated with the qualifiers of "married men" and the "30-55 age demographic". The marketer may inquire as to about how many mobile devices 112 are associated with those qualifiers, similarly to the inquiries discussed above. For example, the campaign interface may indicate approximately 1000 mobile devices 112 associated with the qualifiers of "married men" and the "30-55 age demographic". The marketer may determine that only about 50% of the approximate 1000 is within ABC Department Stores' budget. Thus, the marketer may launch the second round of messages of the campaign to about half as many mobile devices associated with the qualifiers 146 of "women" and the "25-65 year old demographic" compared to the first round of messages and to about half of the total number of mobile devices 112 associated with the qualifiers of "married men" and the "30-55 age demographic". For example, during the second round of the campaign, the common campaign system 142 may transmit messages to 489 mobile devices 112 associated with the qualifiers of "women" and the "25-65 year old demographic" and 525 mobile devices 112 associated with the qualifiers of "married men" and the "30-55 age demographic".

In an embodiment, the common campaign system 142 may be configured to send different messages to different mobile devices 112 based on the associated qualifiers 146. For example, the marketer may create a campaign targeted to mobile devices 112 associated with the qualifiers of "women" and the "25-65 year old demographic" and mobile devices 112 associated with the qualifiers of "married men" and the "30-55 age demographic". The marketer may configure the common campaign gateway 148 through the campaign interface 156 to transmit messages which illustrate and/or describe the elegance and utility of the new line of purses to mobile devices 112 associated with the qualifiers 146 of "women" and the "25-65 year old demographic". The marketer may also configure the common campaign gateway 148 through the campaign interface 156 to transmit messages which illustrate and/or describer "how happy their wives will be to have one of the purses of this new line." In an embodiment, the separate messages may be transmitted in different campaigns. Furthermore, if a campaign comprises more than one round of messages to mobile devices 112, messages may be changed and/or updated between each round.

In an embodiment, the common campaign system 142 may also comprise a disposition channel adapter interface 150 coupling the common campaign gateway 148 to one or more adapters 152. The disposition channel adapter interface 150 may be configured to link the common campaign gateway 148 with one or more adapters 152 so that the common campaign gateway 148 may transmit one or more messages to mobile devices 112 associated with adapters 152. Adapters 152 may be configured to adapt interfaces such as Google cloud, apple push, urban airship, spotlight offer, advert, and/or the like with the disposition channel adapter interface 150 so that one or more messages may be transmitted by the common campaign gateway 148 to mobile devices 112 using one or more of the interfaces.

For example, a marketer for ABC Department Store may have created a campaign using the qualifiers 146 of "women" and the "25-65 year old demographic". After attaching one or more messages to the campaign and initiating the campaign, the common campaign gateway 148 may transmit the one or more messages through the disposition channel adapter interface 150 and through the adapter 152 which are linked to mobile device(s) 112 associated with the qualifiers 146. For example, the message(s) may be transmitted to through the Google cloud adapter to a plurality of mobile device(s) 112 utilizing the Google cloud. Additional message(s) may be transmitted through the spotlight offer adapter to a plurality of mobile device(s) 112 utilizing the spotlight offer features. In an embodiment, a mobile device 112 may be utilizing two or more interfaces such that message(s) may transmitted through two or more adapters 152 to reach the same mobile device 112. As will be discussed further herein, mobile device owners and/or users may indicate which interface(s) on their mobile device(s) 112 may receive message(s). In an embodiment, one interface may comprise a zone core application stored on a mobile device 112.

Zone core applications may comprise a collection of services (e.g. entertainment services to view springtv, bill pay, device self-diagnostics, information notifications, news and promotions, place your add, *2 intercept to intercept customer care calls to help diagnose problem before actually connecting to customer care representatives, and/or the like) providing raw data (e.g. information/data) to applications on a mobile device 112. The zone core may be used as an interface to provide one or more message(s) to a mobile device 112 utilizing the zone core. Furthermore, in an embodiment, zone media service (ZMS) applications associated with the zone core may transmit raw data to the data store 158 based on interactions between the zone core and the owner and/or user of the mobile device 112.

As previously discussed, the core system 140 may comprise a common campaign system 142 an analytics system 144, and a Data Visualization System 180. The analytics system 144 may be configured to collect raw data from mobile device(s) 112 and/or data sources, such as data sources 128 and 130 associated with mobile device(s) 112 and associate the mobile device(s) 112 and thus the raw data with unique identifier(s). In an embodiment, the analytics system 144 may receive raw data with metadata attached to the raw data from a mobile device 112. The metadata may be attached to the raw data to describe and/or identify the type of raw data being sourced in the analytics system 144. The raw data may be associated with an address and/or an identification so that the analytics system 144 may associate individual mobile device(s) 112 and/or groups of mobile device(s) 112 with one or more particular units of raw data. Raw data may comprise customer preference(s) (e.g. customer information profile(s)), zone media service events (events associated with zone core stored on a mobile device 112), mobile device 112 owner and/or user demographics, a mobile device's 112 current and/or past locations, one or more events associated with an electronic wallet, a time component, any combination thereof, and/or the like.

For example, a mobile device owner may purchase a pair of women's shoes at ABC Department Store using an electronic wallet embedded in the memory 126 of an owner's mobile device 112. The mobile device 112 may transmit the raw data and metadata to the analytics system 144. The metadata may inform the analytics system 144 that raw data identifies a use of the electronic wallet, a purchase of women's shoes, a purchase at ABC Department Store, a cost associated with the purchased women's shoes, and/or a time component. As will be discussed further herein, the analytics system 144 may sort and/or categorize an identifier associated with a mobile device 112 based on the raw data.

The analytics system 144 may be configured to communicate with the common campaign system 142. In an embodiment, the common campaign system 144 may transmit qualifier(s) 146 to the analytics system 144 to obtain a count of mobile device(s) 112 associated with the qualifier(s) 146 and/or a list of mobile device(s) 112 associated with the qualifier(s) 146 to transmit one or more message(s) to the mobile device(s) 112. For example, a marketer for ABC Department Store may be interacting with the campaign interface 156 of the common campaign gateway 148 and inquire into about how many mobile device(s) 112 may be associated with the qualifier(s) 146 of "women" and the "25-65 year old demographic". The analytics system 144 may be continuously receiving new raw data so that the number of mobile device(s) 112 associated with those qualifiers 146 may be constantly changing. Thus the analytics system 144 may provide a rough estimate to the common campaign system 142 indicating about how many mobile devices 112 may be associated with the provided qualifiers 146.

Additionally, the marketer for ABC Department Store may determine that the rough estimate from the analytics system 144 indicating a particular estimate about the number of mobile device(s) 112 which may be associated with the qualifier(s) 146 of "women" and the "25-65 year old demographic" is adequate. The marketer may initiate a campaign 154 based on the qualifiers 146 and transmit the campaign 154 from the common campaign system 142 to the analytics system 144. The analytics system 144 may then provide a list of mobile devices 112 associated with the qualifiers 146 "women" and the "25-65 year old demographic" to the common campaign system 142. The marketer may provide one or more messages which may be transmitted to each of the mobile device(s) 112 on the list. In an embodiment, while the marketer may be informed about the exact number of mobile devices 112 which may have had message(s) transmitted to the mobile device(s) 112, the analytics system 144 may not provide the information identifying the owner(s) and/or user(s) of each of the mobile device(s) 112 to the common campaign system 142 and/or the marketer.

The analytics system 144 may generally comprise a data store 158, an online analytics processor layer 160, a qualifier definition data store 162, and an analytics gateway 164. The data store 158 may be configured to receive the raw data and the metadata from the data source(s) and store the raw data with the metadata. The data store 158 may associate each item of raw data with a mobile device identifier of a particular mobile device 112 and/or a set of mobile devices 112. The data store 158 may comprise a two-tier design pattern comprising an organizer layer (first tier) and a compute layer (second tier). The organizer layer may receive raw data associated with a mobile device 112. The organizer layer may break up the raw data and store the broken data into a plurality of nodes in parallel with each other on the compute layer.

For example, a mobile device owner may have purchased women's shoes for $100 on sale (i.e. non-sale price was $120) at ABC Department Store in Metro City on a Thursday afternoon using a data source such as an electronic wallet embedded in the mobile device 112. The electronic wallet may transmit raw data identifying that an owner and/or user of a mobile device 112 used an electronic wallet, purchased women's shoes, paid $100 for the shoes, bought the shoes on sale, shopped at ABC Department Store, shopped in Metro City, and was shopping on a Thursday afternoon. Metadata may be associated with each piece of raw data for reasons to be discussed further herein. The organizer layer may receive each piece of raw data and associate it with a particular mobile device 112. The organizer layer may store each piece of raw data on a different node of the compute layer and record the node where each piece of raw data was stored.

Thus, when a campaign 154 is initiated and qualifier(s) are transmitted to the analytics system 144, the organizer layer of the data store 158 may identify which nodes of the compute layer are storing raw data associated with one or more of the qualifier(s) 146 and distribute one or more scripts to one or more nodes. The nodes may then take the results of the one or more scripts and provide the raw data associated with the qualifier(s) 146 of the campaign to the organizer layer to assemble the raw data together. In an embodiment, this system may be a map/reduce system. In an embodiment, the data store 158 may comprise a Hadoop. One of ordinary skill in the art may be may identify one or more systems which may be implemented to store and retrieve data in a data store.

It should be understood, that the data store 158 may be continuously receiving raw data from one or more mobile device(s) 112 and/or one or more data sources, such as data sources 128 and 130. Thus, the number of mobile device(s) 112 which may be associated with one or more qualifier(s) 146 may be constantly changing. It follows, that because the number of mobile device(s) 112 which may be associated with one or more qualifier(s) 146 may be constantly changing, when a marketer makes an inquiry about the number of mobile device(s) 112 which may be associated with one or more particular qualifier(s) 146, the number of mobile device 112 provided as a result of the inquiry may be different from the actual number of mobile devices 112 which may be selected for message transmission by the common campaign system 142. Thus, as previously mentioned, the analytics system 144 may provide an estimate of the number of mobile device(s) 112 which may be provided when a campaign is initiated using the same qualifier(s) 146 used during the inquiry.

In an embodiment, data sources such as spotlight may also provide raw data and metadata to the data store 158. Spotlight is an application which identifies when a mobile device owner and/or user indicates whether they like or dislike a message transmitted, for example, from the common campaign system 142. Thus, if a first round of message(s) is sent to a mobile device 112 and the owner and/or user of the mobile device 112 indicates that they don't like or aren't interested in the subject matter of the first message, that indication may be sent to the data store 158 so that when a list is generated for second round of message(s) that particular mobile device 112 may not be added to the list of mobile device(s) 112 which are to receive the second round of message(s).

The analytics system 144 may also comprise an online analytics processor layer 160. The online analytics processor layer 160 may be configured to generate types of qualifier(s) 146 to be stored in the qualifier definition data store 162 and provided to the common campaign gateway 148 based on examining the raw data in the data store 158 using one or more heuristics. Heuristics may comprise experience-based techniques, strategies, rules of thumb, educated guesses, intuitive judgment, common sense, and/or the like, using readily accessible, though possibly loosely applicable, raw data to make inferences.

For example, active agents of the online analytics processor layer 160 may be continuously examining raw data in the data store 158. Metadata associated with each piece of raw data may be read by the active agents to determine what type of raw data the online analytics processor layer 160 is receiving. The online analytics processor layer 160 may then take the raw data and the metadata and implement one or more heuristics to associate one or more qualifier(s) stored in the qualifier definition data store 162 with the raw data and metadata. For example, the mobile device owner who may have purchased women's shoes for $100 on sale (i.e. non-sale price was $120) at ABC Department Store in Metro City on a Thursday afternoon using a data source such as an electronic wallet embedded in the mobile device 112 may have the raw data and metadata associated with purchasing event store in the data store 158. The online analytics processor layer 160 may identify this raw data and metadata stored in the data store 158 and implement one or more heuristics to categorize the owner and/or user of the mobile device 112 associated with raw data. For example, using an extraction, transformation, and load process (ETL Process), the online analytics processor layer 160 may identify the raw data that a purchase of women's shoes was made and that the purchase was a sale purchase. The online analytics processor layer 160 may use heuristics which suggest that women generally purchase women's shoes and that women are generally prevalent "sale" shoppers. Thus, using those heuristics, the online analytics processor layer 160 may associate the owner and/or user of the mobile device 112 as a woman.

In an embodiment, the online analytics processor layer 160 may generate new heuristics based on inferences. For example, the online analytics processor layer 160 may not make an inference using a heuristic that mobile device owners and/or users who purchase neckties also purchase suspenders. However, after examining raw data associated with multiple mobile device(s) 112, the online analytics processor layer 160 may identify that many mobile device owners and/or users who purchase neckties also purchase suspenders. Thus, the online analytics processor layer 160 may add the new heuristic making an inference between purchasing neckties and suspenders.

In an embodiment, the online analytics processor layer 160 may make inferences using heuristics and associate a weight to the inference. Using the previous example, the online analytics processor layer 160 may identify the raw data that a purchase of women's shoes was made and that the purchase was a sale purchase. The online analytics processor layer 160 may use heuristics which suggest that women generally purchase women's shoes and that women are generally prevalent "sale" shoppers. Thus, using those heuristics, the online analytics processor layer 160 may associate the owner and/or user of the mobile device 112 as a woman. In an addition to making an inference using heuristics, the online analytics processor layer 160 may assign different weights to the inferences based on the heuristics used.

For example, the online analytics processor layer 160 may assign a higher weight (e.g. a higher likelihood) to the heuristic that the purchasing of women's shoes is done by a woman than the weight assigned to the heuristic that someone purchasing items on sale would be purchased by a woman. Heuristic weights may be based on a number system such as heuristics with a weight of 10 or 100 have the strongest probability and 1 or 0 with the weakest probability. Heuristic weights may be weighted by categories such as strong heuristic, moderate heuristic, and weak heuristic. In an embodiment, a marketer may selected a weight range, weight minimum, weight maximum and/or the like for one or more heuristics which may be used when inquiring about a campaign 154 and/or when initiating a campaign 154. In an embodiment, the cost of the campaign 154 may be based at least partially on the weight of the heuristics used to associate owners and/or users of mobile device(s) 112 with the qualifier(s) 146. Thus, when making an inquiry about the number of mobile device(s) 112 a campaign with a selected set of qualifier(s) 146 provides, the weight of the heuristics used may affect the number of identified mobile device(s) changing the cost of the campaign.

In an embodiment, using an extraction, transformation, and load process, the online analytics processor layer 160 may use raw data and metadata associated with the raw data to generate one or more new qualifier(s) 146 to be stored in the qualifier definition data store 162. For example, the qualifier definition data store 162 may not have a "married men with children" qualifier 146. The online analytics processor layer 160 may examine raw data and metadata associated with the raw data, for example, that a man purchased a diamond bracelet using an electronic wallet embedded on the man's mobile device and also purchased children's soccer shoes using the same electronic wallet. The online analytics processor layer 160 using heuristics may determine that the man is married and that the man has at least one child. The online analytics processor layer 160 may then examine the qualifier definition data store 162 and determine that no qualifier 146 exists in the qualifier definition data store 162 which identifies married men with children. Thus, the online analytics processor layer 160 may create a new qualifier of "married men with children" and store this qualifier 146 in the qualifier definition data store 162. In an embodiment, the new qualifier of "married men with children" may then be transmitted to the common campaign gateway 148 for potential selection by a marketer.

The analytics system 144 may comprise a qualifier definition data store 162 configured to store and transmit qualifier(s) 146 to the common campaign gateway 148. For example, based on the raw data and metadata stored in the data store 158 and examined by the online analytics processor layer 160, the qualifier(s) 146 associated with the stored raw data and metadata may be transmitted from the qualifier definition data store 158 through the analytics gateway 164 and to the common campaign gateway 148 to be presented for example to a marketer to create a campaign 154. The qualifier definition data store 162 may also be configured to receive and transmit qualifier(s) 146 from/to the online analytics processor layer 160.

For example, as previously discussed, by examining the raw data and metadata stored in the data store 158, the online analytics processor layer 160 may generate one or more new qualifier(s) 146 to be stored in the qualifier definition data store 162. Additionally, for example, after the initiation of an inquiry and/or the initiation of a campaign 154, the qualifier definition data store 162 may transmit one or more qualifier(s) 146 to the online analytics processor layer 160 which may identify raw data and metadata related with mobile device(s) 112 and associated with the qualifier(s) 146.

The analytics system 144 may comprise an analytics gateway 164. Using an analytics gateway application programming interface 166, the analytics gateway 164 may be configured to provide a communication link, for example via the network 116, between the analytics system 144 and the common campaign gateway 148 of the common campaign system 142. For example, the analytics gateway 164 may generate a list of mobile device(s) 112 associated with qualifier(s) 146 selected for a campaign 154 and transmit the list of mobile device(s) 112 to the common campaign gateway 148 so that one or more message(s) may be transmitted through the disposition channel adapter interface 150 and the adapters 152 and to the mobile device(s) 112 provided on the generated list. The analytics gateway 164 may also transmit qualifier(s) 146 to the common campaign gateway 148. For example, after the online analytic processor layer 160 identifies one or more new qualifier(s) 146, the analytics gateway 164 may transmit the new qualifier(s) 146 to the common campaign gateway 148 for potential selection by a marketer.

In an embodiment, the analytics gateway 164 may comprise a plurality of lead lists 168 and a plurality of recommendation lists 170. Qualifier(s) 146 may be selected by a marketer for example and designated for a lead list 168 or a recommendation list 170. Qualifier(s) 146 selected for a lead list 168 may drive the qualifier(s) 146 selected by a marketer. Conversely, qualifier(s) 146 selected for a recommendation list 170 may be driven by the lead list 168. For example, a marketer may create a campaign based on two qualifiers 146: 1) men between the ages of 25 and 64 and 2) the top 5 books purchased. The first qualifier "men between the ages of 25 and 64" may be designated for a lead list 168 while the second qualifier "the top 5 books purchased" may be designated for a recommendation list 170. Thus, based on the designations, the top 5 books purchased only mobile device(s) 112 owned and/or used by men between the ages of 25 and 64 may be identified.

In an embodiment, the analytics system 144 may also comprise a profile definition data store 172. The profile definition data store 172 may store profile data about owners and/or users of mobile device(s) 112. Profile data may comprise age, sex, religion, socio-economic status, address, ethnicity, country of origin, and/or the like. Profile data may be provided by owners and/or users of mobile device(s) 112 when the mobile device(s) 112 were purchased and/or when the owner and/or user of the mobile devices signed up for mobile service. Profile data may also be provided from third parties, such as mobile device application providers, who received the profile data from the owners and/or users of mobile device(s) 112. The profile definition data store 172 may provide profile data to the online analytics processor layer 160 so that the online analytics processor layer 160 may make better inferences using heuristics.

In an embodiment, the online analytics processor layer 160 may identify profile data by examining the raw data and metadata stored in the data store 158. Upon identifying the profile data, the online analytics processor layer 160 may provide the profile definition data store 172 with profile data associated with one or more identification of one or more mobile device(s) 112. In an embodiment, the profile definition data store 172, may provide profile qualifiers to the common campaign gateway 148 so that a marketer may select profile qualifiers to create a campaign 154. In an embodiment, one or more message(s) may be transmitted to one or more mobile device(s) 112. The message(s) may be related at least to one or more components of profile data.

In an embodiment, the core system 140 may also comprise a data visualization system 180. In an embodiment, the data visualization system 180 may be an application that executes on a computer. The data visualization system 180 is configured to identify the location of one or more mobile device(s) 112 in near real time based on a mobile device identification. For example, the data visualization system 180 may receive a list of mobile device(s) 112. The data visualization system 180 may identify the current location each mobile device 112. The data visualization system 180 may identify the location of each mobile device 112 based on GPS, trilateration, an interaction between an electronic wallet embedded in the mobile device 112, an identification that a mobile device is utilizing a particular wireless local area network (WLAN), and/or the like.

In an embodiment, the data visualization system 180 may be configured to communicate with the common campaign system 142 and/or the analytics system 144. In an embodiment, one or more qualifier(s) 146 may comprise geographic parameters of mobile device(s) 112 to be used with the data visualization system 180. For example, a marketer for QRS Department Store may be creating a campaign comprising the qualifiers 146 of "men", "people between the ages of 25 and 65", and "people within 300 yards from the location of the QRS Department Store." The marketer may desire to provide a 30 minute sale for neckties to owners and/or users of mobile device(s) 112 associated with those qualifiers 146. The marketer may make an inquiry to determine how many mobile device 112 are associated with the qualifier(s) 146. For example, the marketer may select those qualifier(s) 146 in the campaign interface 156. The common campaign gateway 148 may transmit those qualifier(s) 146 to the analytics gateway 164 which may obtain an estimate of the number of mobile device(s) 112 associated with qualifier(s) 146 of "men" and "people between the ages of 25 and 65" from data collected from the data store 158. Additionally, the common campaign gateway 148 may then communicate with the data visualization system 180 by providing a list generated when the inquiry was made of mobile device(s) 112 associated with qualifiers of "men" and "people between the ages of 25 and 65". The data visualization system 180 may then identify the number of mobile device(s) 112 which are 300 yards from the location of the QRS Department Store at the time the inquiry was made and transmit that number to the campaign interface 156 to be read by the marketer. Thus, a marketer may initiate multiple inquiries at different times to determine in near real time when the most owners and/or users of mobile device(s) 112 associated with, for example, the qualifiers of "men" and "people between the ages of 25 and 65" are within 300 yards of the location of the QRS Department Store to determine the best time transmit messages to the greatest number of mobile device(s) 112.

In an embodiment, the data visualization system 180 may continuously track the location of mobile device(s) 112. Continuously tracking the location of mobile device(s) 112 may comprise tracking about every second, about every 5 seconds, about every 10 seconds, about every 15 seconds, about every 20 seconds, about every 25 seconds, about every 30 seconds, about every 35 seconds, about every 40 seconds, about every 45 seconds, about every 50 seconds, about every 55 seconds, about every minute, about every 2 minutes, about every 5 minutes, about every 7 minutes, about every 10 minutes, about every 12 minutes, about every 15 minutes, about every 17 minutes, about every 20 minutes, and/or the like. For example, after the common campaign gateway 148 transmits the qualifier(s) 146 to the analytics gateway 164, the analytics gateway 164 may obtain a list of all the mobile device(s) 112 may have ever been associated with the qualifiers 146 of "men" and "people between the ages of 25 and 65" from data collected from the data store 158. The data collected from the data store 158 may comprise a time component providing the time when each of the mobile device(s) 112 were associated with those qualifiers. The analytics gateway 164 may then transmit the list of mobile devices which have ever been associated with the qualifiers of "men" and "people between the ages of 25 and 65" along with the time component identifying the time when the mobile device(s) 112 were or the time since the mobile device(s) have been associated with qualifiers to the data visualization system 180. The data visualization system 180 may then map which mobile device(s) 112 may have ever been within 300 yards of the location of the QRS Department Store.

Once the data visualization system 180 identifies the mobile device(s) 112 which have ever been associated with the qualifiers of "men" and "people between the ages of 25 and 65" and which have ever been within 300 yards of the location of the QRS Department Store, the data visualization system 180 may then reference the list to determine when each of the mobile device(s) 112 were associated with the qualifiers of "men" and "people between the ages of 25 and 65" and cross-reference that time with the time that those mobile device(s) 112 were within 300 yards of the location of the QRS Department Store. The data visualization system 180 may then provide an average over a period of time, a maximum and/or minimum number of mobile device(s) 112 during a selected hour and/or during a selected day of the week, and/or the like of the number of mobile device(s) 112 associated with qualifiers of "men" and "people between the ages of 25 and 65" which may be within 300 yards of the location of the QRS Department Store.

In an embodiment, the data visualization system 180 may continuously track the locations of all mobile device(s) 112 and continuously track when each mobile device 112 is in each location. The data visualization system 180 may then continuously transmit raw data and metadata as well as mobile device identifications for each mobile device 112 to the data store 158. The data store 158 may be continuously updated by the data visualization system 180 with the location and time of each mobile device 112. Thus, when the common campaign gateway 148 transmits the qualifier(s) 146 of "men", "people between the ages of 25 and 65", and "people within 300 yards from the location of the QRS Department Store," the analytics gateway 164 may provide a near real time estimate of the number of mobile device(s) 112 which may be transmitted messages based on those qualifier(s) 146 at any selected time and/or any time at all. In an embodiment, in near real time may comprise identifying that one or more mobile device(s) 112 are located in a selected geographic area so that when a message is transmitted to the one or more mobile device(s) 112 at least one of the mobile device(s) 112 is located in the selected geographic area.

In an embodiment, the data visualization system 180 may be configured to provide a near real time map showing how close one or more mobile device(s) associated with selected qualifier(s) 146 are to one or more selected locations. For example, after the common campaign gateway 148 transmits qualifier(s) 146 of "men" and "people between the ages of 25 and 65" to the analytics gateway 164, the analytics gateway 164 may obtain a list of all the mobile device(s) 112 which are associated with those qualifier(s) 146 from data collected from the data store 158. The analytics gateway 164 may transmit the list to the data visualization system 180. The data visualization system 180 may identify all the mobile device(s) 112 provided in the list from the analytics gateway 164 and transmit a map to the campaign interface 156 of the common campaign gateway 148 showing the locations of the all the mobile device 112 associated with qualifiers 146 in near real time.

A marketer, through the common campaign gateway 148, may adjust the geographic range (e.g. distance) from one or more locations to target a selected number of mobile device(s) 112 in near real time associated with the qualifiers 146 and transmit one or more message(s) to the mobile device(s) 112 which are within and/or outside of the range of the one or more locations. The marketer may initiate a campaign and send one or more message(s) to mobile device(s) 112 based on the map providing the location of mobile device(s) 112 associated with the qualifiers 146 in near real time. In an embodiment, one or more rounds of message(s) may be transmitted to mobile device(s) 112 associated with the qualifier(s) 146 based on viewing the map and identifying via the map when a number of mobile device(s) 112 associated with the qualifiers 146 are within a range from one or more locations. In an embodiment, message(s) may or may not be transmitted to one or more mobile device(s) 112 when a particular number of mobile device(s) 112 associated with qualifier(s) 146 are identified within a selected range of one or more locations. For example, a campaign may be created with multiple rounds of messages which are to be transmitted to mobile device(s) 112 at predetermined times and dates. However, if the data visualization system 180 detects that the number of mobile device(s) 112 associated with the selected qualifier(s) 146 are below a minimum when the common campaign system 142 is scheduled to send a round of message(s), the common campaign system 142 may not send message(s). The common campaign system 142 may notify a marketer through the campaign interface 156 that message(s) were not sent and why so that the marketer may adjust the campaign. In an embodiment, the common campaign system 142 may transmit message(s) when the number of mobile device(s) 112 exceeds the minimum number.

Figure 2:
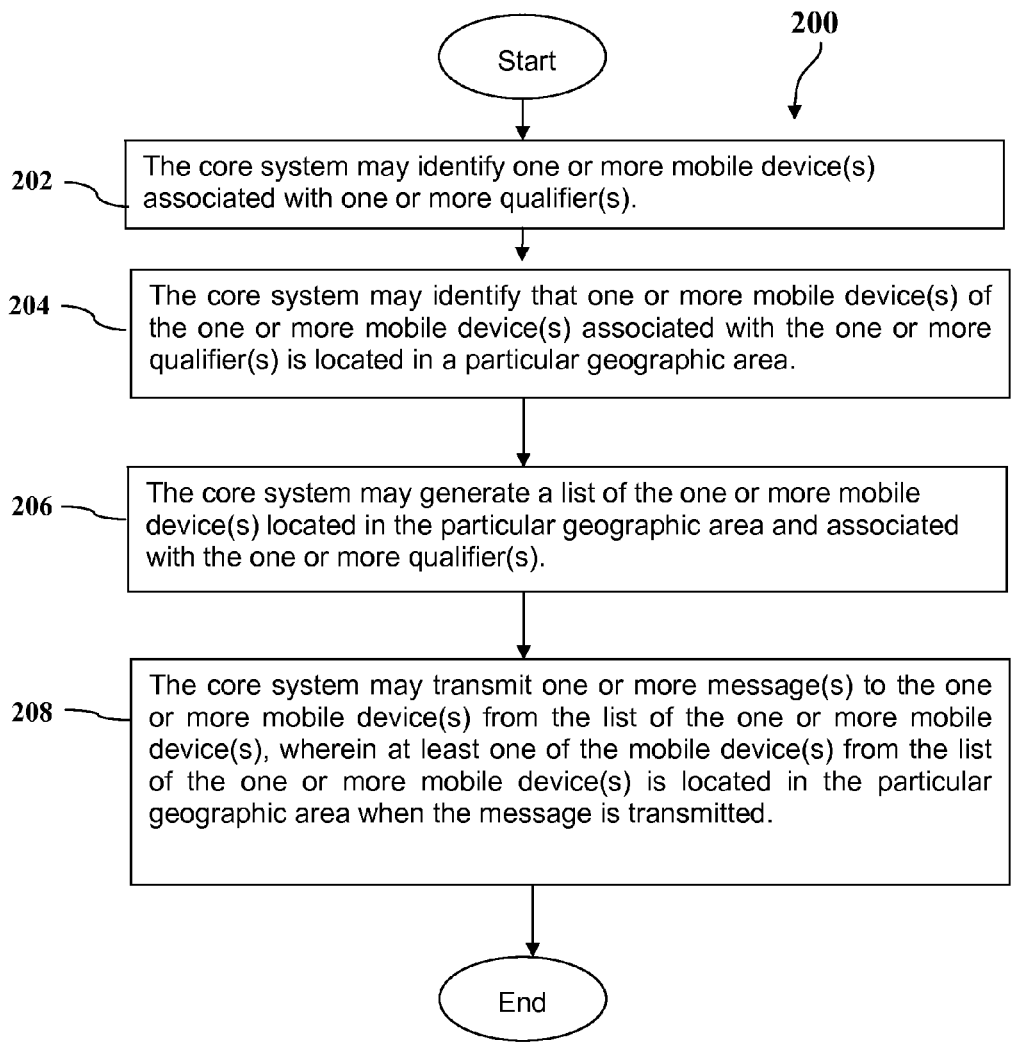
FIG. 2 is a flow chart of a method according to an embodiment of the disclosure.

In FIG. 2, a method 200 is described. At block 202, the core system 140 may identify one or more mobile device(s) 112 associated with one or more qualifier(s) 146. For example, a marketer may selected one or more qualifier(s) 146 which may be associated with owners and/or users of mobile device(s) 112. A data store 158 may be accessed to identify one or more mobile device(s) 112 (e.g. a mobile device identifications) which may associated with the one or more qualifier(s) 146. The one or more mobile device(s) 112 may be associated with the one or more qualifier(s) 146 by examining raw data and metadata associated with the mobile device(s) 112. Using heuristics, one or more inference(s) may be made associating the raw data and the metadata with the qualifier(s) 146. In an embodiment, the core system 140 may identify the one or more mobile device(s) 112 associated with the one or more qualifier(s) by identifying profile data associated with one or more mobile device(s) 112 and relating the profile data with one or more qualifier(s) using heuristics.

At block 204, the core system 140 may identify that one or more mobile device(s) 112 of the one or more mobile device(s) 112 associated with the one or more qualifier(s) 146 is located in a selected geographic area. For example, through the data visualization system 180, the core system 140 may identify the locations of each mobile device 112 and identify which of the mobile device(s) 112 which are associated with the one or more qualifier(s) 146 are in a selected geographic area.

At block 206, the core system 140 may generate a list of the one or more mobile device(s) 112 located in the selected geographic area and associated with the one or more qualifier(s) 146. In an embodiment, the list may provide an address to each mobile device 112 without identifying the owner and/or user of any of the mobile device(s) 112 and/or any actual avenue to independently, for example, by a marketer, identify which mobile device(s) 112 are listed.

At block 208, the core system 140 may transmit one or more message(s) to the one or more mobile device(s) 112 from the list of the one or more mobile device(s) 112, wherein at least one of the mobile device(s) 112 from the list of the one or more mobile device(s) 112 is located in the selected geographic area when the message is transmitted. For example, the data visualization system 180 may identify a set of mobile device(s) 112 associated with one or more qualifier(s) 146 in a selected location and/or geographic area. The core system 140 may be configured to locate mobile device(s) 112 in near real time so that one or more message(s) may be transmitted when at least one of the mobile device(s) is still located in a geographic area. In an embodiment, the core system 140 may be configured to locate mobile device(s) 112 in near real time so that one or more message(s) may be transmitted when at least half of the mobile device(s) are still located in a geographic area. In an embodiment, the one or more message(s) may be related to at least one of the qualifier(s) 146 and/or the selected geographic area.

In an embodiment, the method 200 may comprise that the core system 140 identifies at a second time (e.g. a later time) a second set of one or more mobile device(s) 112 associated with the same one or more qualifier(s) 146. The second set of one or more mobile device(s) 112 may comprise at least one of a different number of mobile device(s) 112 or at least one different mobile device 112. For example, the message may comprise a selectable link to an advertisement and/or an information message received by at least one of the mobile device(s) 112 (e.g. a message receiving mobile device) of the one or more mobile device(s) 112 associated with the one or more qualifier(s) 146. By selecting the link through the mobile device(s) 112 (e.g. a message receiving mobile device) a transmission of a signal is triggered which excludes the mobile device 112 receiving the message (e.g. a message receiving mobile device) from the second set of one or more mobile device(s) 112 associated with the one or more qualifier(s) 146. Thus, the second set of one or more mobile device(s) 112 may not comprise, for example, the message receiving mobile device 112.

In an embodiment, the core system 140 may identify at the second time that one or more mobile device(s) 112 of the second set of one or more mobile device(s) 112 is located in the same selected geographic area. The core system 140 may generate a second list of the one or more mobile device(s) 112 of the second set of one or mobile device(s) 112 located in the selected geographic area. In an embodiment, the core system 140 may transmit a second message to the one or more mobile device(s) 112 from the second list of the second set of one or more mobile device(s) 112, wherein at least one of the mobile device(s) 112 from the second list of the second set of one or more mobile device(s) 112 is located in the selected geographic area when the message is transmitted. In an embodiment, the message and/or the second message may be transmitted to the one or more mobile device(s) 112, wherein at least two mobile device(s) 112 receive the message and/or the second message through different interfaces.

Figure 3:
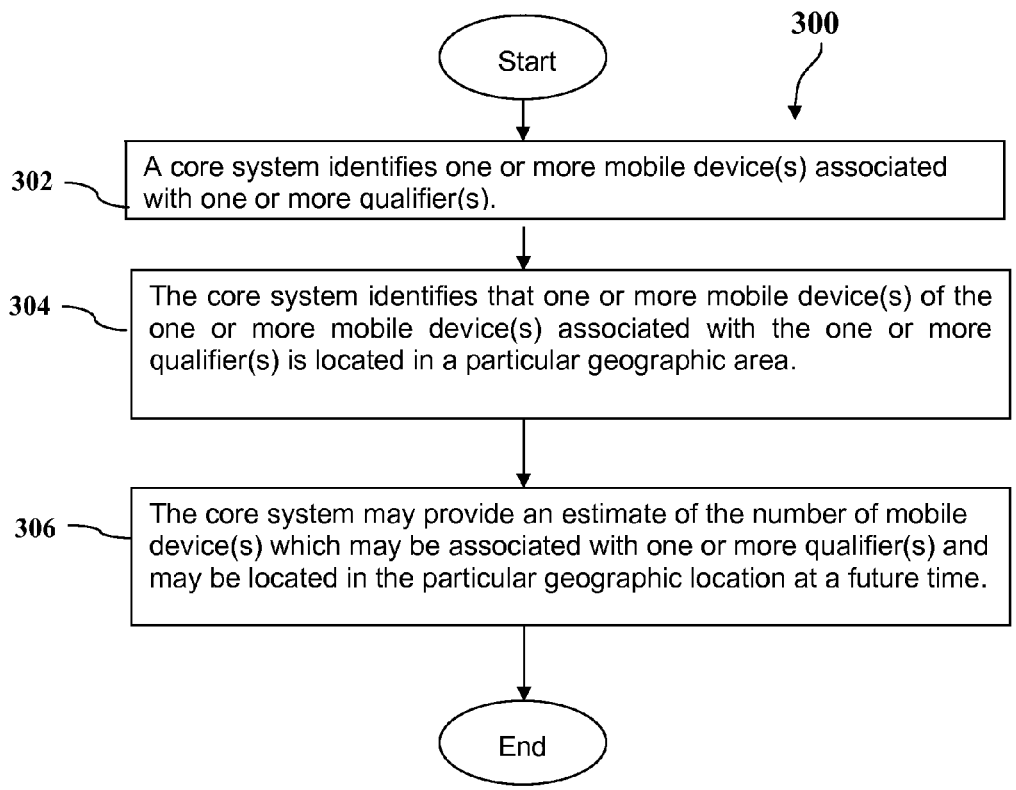
FIG. 3 is a flow chart of a method according to an embodiment of the disclosure.

Turning now to FIG. 3, a method 300 is described. At block 302, a core system 140 identifies one or more mobile device(s) 112 associated with one or more qualifier(s) 146. At block 304, the core system 140 identifies that one or more mobile device(s) 112 of the one or more mobile device(s) 112 associated with the one or more qualifier(s) 146 is located in a selected geographic area. At block 306, the core system 140 may provide an estimate of the number of mobile device(s) 112 which may be associated with one or more qualifier(s) 146 and may be located in the selected geographic location at a future time.

In an embodiment, the method 300 may comprise providing a cost of transmitting one or more message(s) to the identified one or more mobile device(s) 112 of the one or more mobile device(s) 112 associated with the one or more qualifier(s) 146 and located in the selected geographic area based on the estimate. In an embodiment, the method 300 may comprise that a data visualization system 180 provides a map showing the locations of each mobile device 112 associated with the one or more qualifier(s) 146 in near real time.

In an embodiment, the method 300 may comprise that the core system 140 may identify at a second time a second set of one or more mobile device(s) 112 associated with the one or more qualifier(s) 146, wherein the second time is a later time than the time the estimate was provided. The method 300 may comprise that the core system 140 may identify at the second time that one or more mobile device(s) 112 of the second set of one or more mobile device(s) 112 is located in the selected geographic location. The method 300 may comprise that the core system 140 may generate a list of the one or more mobile device(s) 112 of the second set of one or more mobile device(s) 112 located in the selected geographic area. The method 300 may comprise that the core system 140 transmits a message to the one or more mobile device(s) 112 from the list of the second set of one or more mobile device(s) 112, wherein at least one of the mobile device(s) 112 from the list of the second set of one or more mobile device(s) 112 is located in the selected geographic area when the message is transmitted. In an embodiment, the second set of one or more mobile device(s) 112 may comprise at least one of a different number of mobile devices or at least one different mobile device. In an embodiment, the message may be related to at least one of the qualifier(s) 146 or the selected geographic area.

Figure 4:
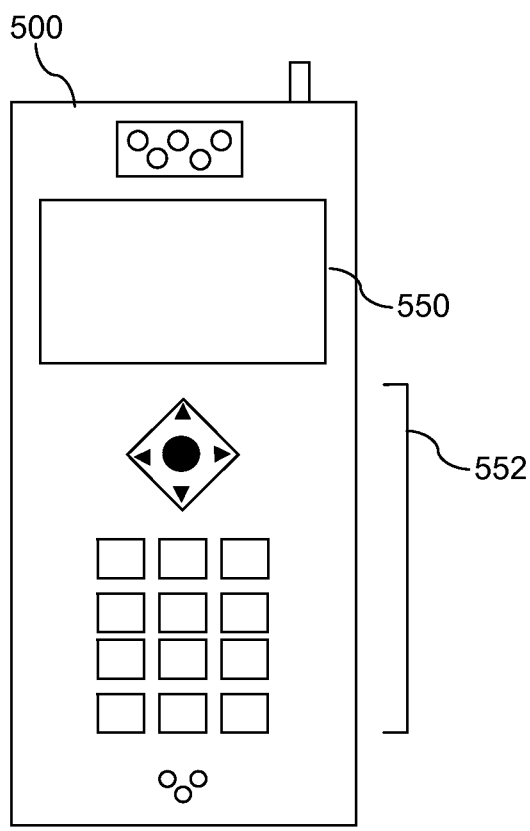
FIG. 4 is an illustration of a mobile device according to an embodiment of the disclosure.

FIG. 4 depicts the mobile device 500, which is operable for implementing aspects of the present disclosure, but the present disclosure should not be limited to these implementations. Though illustrated as a mobile phone, the mobile device 500 may take various forms including a wireless handset, a pager, a personal digital assistant (PDA), a gaming device, or a media player. The mobile device 500 includes a display 550 and a touch-sensitive surface and/or keys 552 for input by a user. The mobile device 500 may present options for the user to select, controls for the user to actuate, and/or cursors or other indicators for the user to direct. The mobile device 500 may further accept data entry from the user, including numbers to dial or various parameter values for configuring the operation of the handset. The mobile device 500 may further execute one or more software or firmware applications in response to user commands. These applications may configure the mobile device 500 to perform various customized functions in response to user interaction. Additionally, the mobile device 500 may be programmed and/or configured over-the-air, for example from a wireless base station, a wireless access point, or a peer mobile device 500. The mobile device 500 may execute a web browser application which enables the display 550 to show a web page. The web page may be obtained via wireless communications with a base transceiver station, a wireless network access node, a peer mobile device 500 or any other wireless communication network or system.

Figure 5:
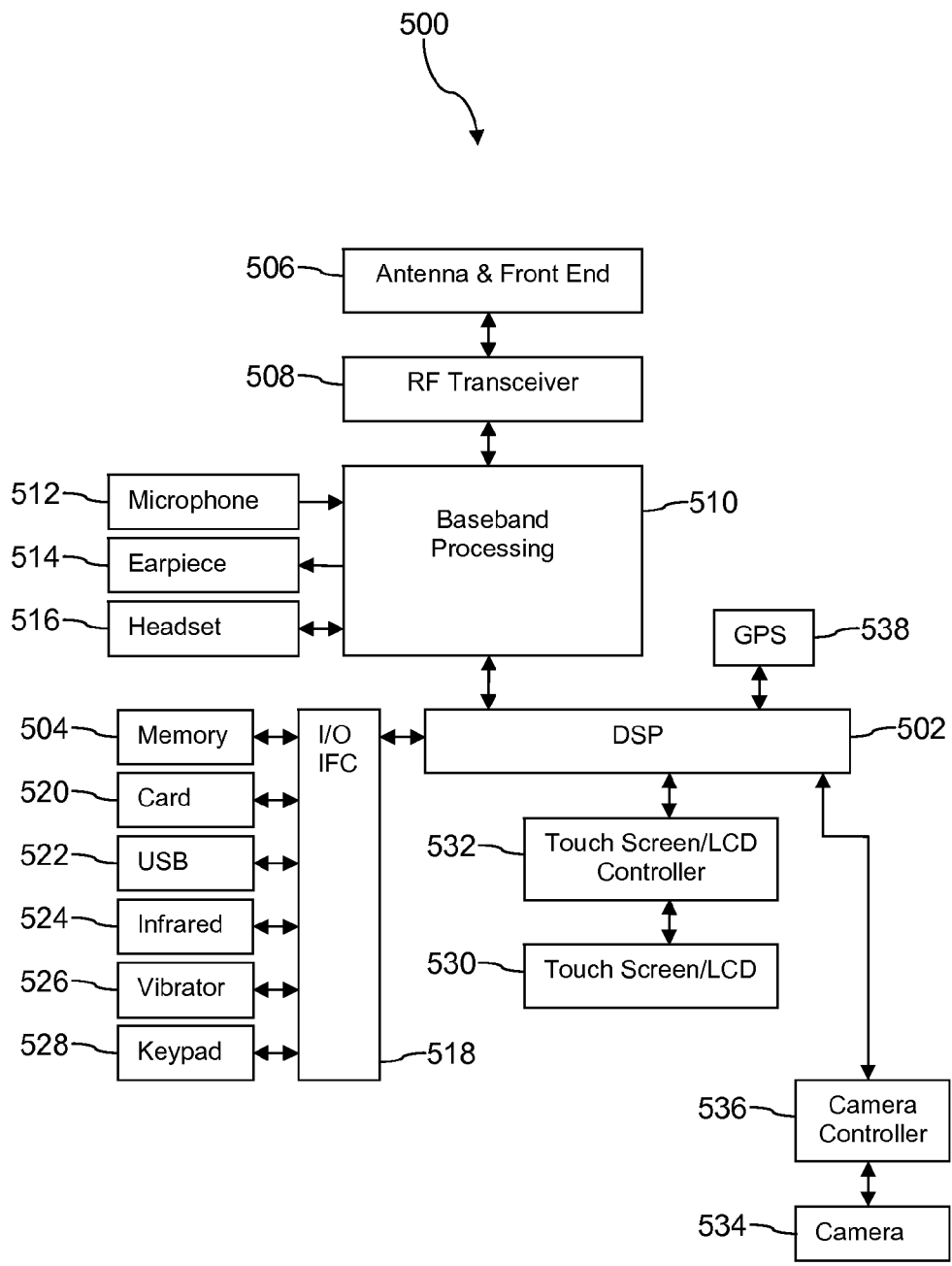
FIG. 5 is a block diagram of a mobile device according to an embodiment of the disclosure.

FIG. 5 shows a block diagram of the mobile device 500. While a variety of known components of handsets are depicted, in an embodiment a subset of the listed components and/or additional components not listed may be included in the mobile device 500. The mobile device 500 includes a digital signal processor (DSP) 502 and a memory 504. As shown, the mobile device 500 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 500 may include another kind of display that does not provide a touch sensitive screen. In an embodiment, the DSP 502 may communicate directly with the memory 504 without passing through the input/output interface 518. Additionally, in an embodiment, the mobile device 500 may comprise other peripheral devices that provide other functionality.

The DSP 502 or some other form of controller or central processing unit operates to control the various components of the mobile device 500 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 500 to function as a peripheral device to exchange information with a personal computer or other computer system. The infrared port 524 and other optional ports such as a Bluetooth® interface or an IEEE 802.11 compliant wireless interface may enable the mobile device 500 to communicate wirelessly with other nearby handsets and/or wireless base stations.

The keypad 528 couples to the DSP 502 via the interface 518 to provide one mechanism for the user to make selections, enter information, and otherwise provide input to the mobile device 500. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 500 to determine its position.

Figure 6A:
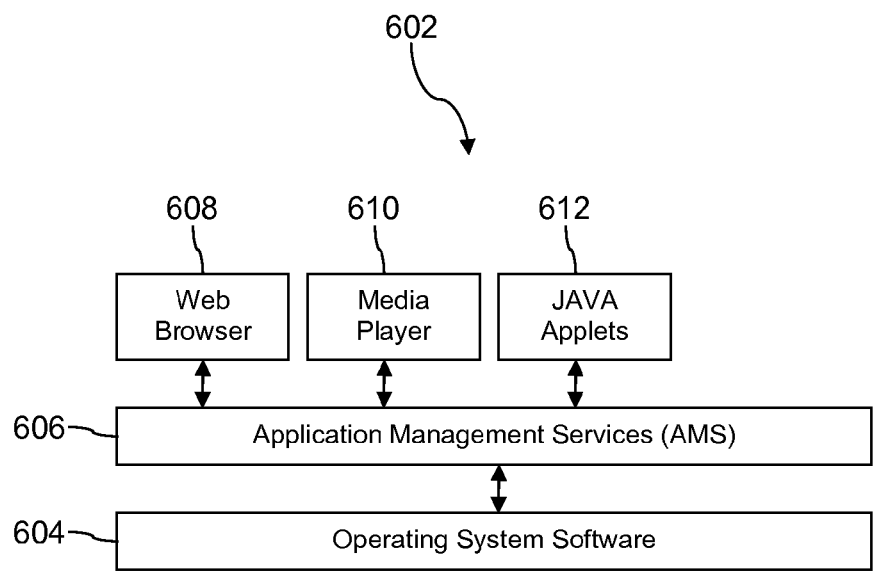
FIGS. 6A and 6B are block diagrams of software architecture for a mobile device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 500. Also shown in FIG. 6A are a web browser application 608, a media player application 610, and JAVA applets 612. The web browser application 608 may be executed by the mobile device 500 to browse content and/or the Internet, for example when the mobile device 500 is coupled to a network via a wireless link. The web browser application 608 may permit a user to enter information into forms and select links to retrieve and view web pages. The media player application 610 may be executed by the mobile device 500 to play audio or audiovisual media. The JAVA applets 612 may be executed by the mobile device 500 to provide a variety of functionality including games, utilities, and other functionality.

Figure 6B:
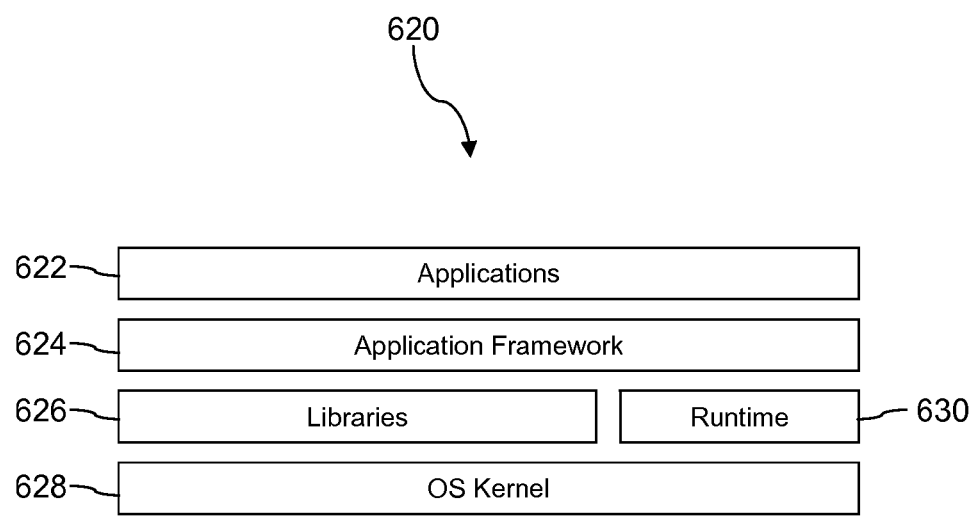

FIG. 6B illustrates an alternative software environment 620 that may be implemented by the DSP 502. The DSP 502 executes operating system software 628 (for example an operating system kernel) and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
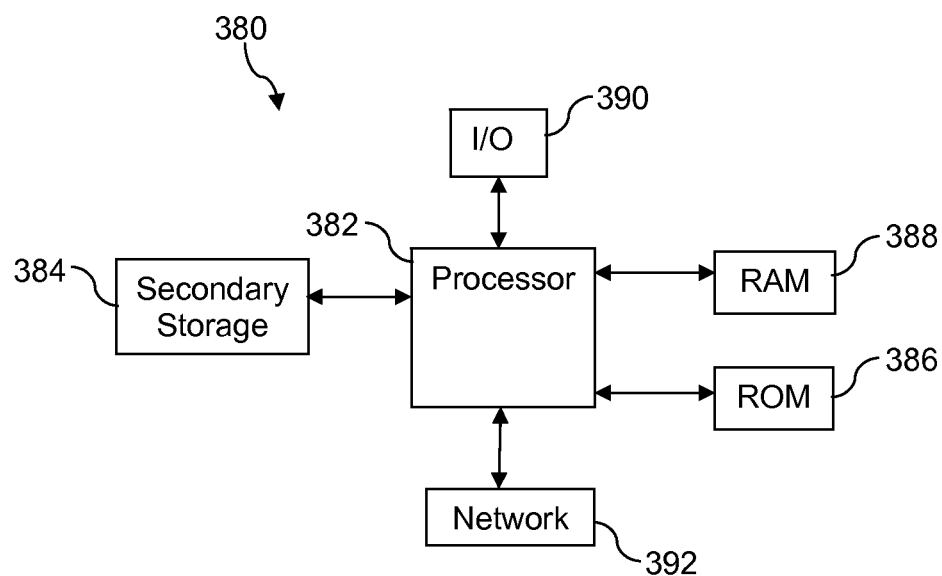
FIG. 7 is a block diagram of an exemplary computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A message distribution system for distributing messages to qualified mobile devices, the system comprising:
   an analytics system comprising at least one processor and at least one non-transitory memory, configured to:
   receive and analyze raw data for a plurality of mobile devices gathered through interactions between each mobile device user and a corresponding mobile device,
   associate each mobile device of the plurality of mobile devices with one or more qualifiers based on the analysis of the raw data for each mobile device, wherein the one or more qualifiers comprise at least one characteristic associated with at least one of a mobile device, a mobile device user, or a mobile device owner, identify, based on the analysis and the association, one or more mobile devices of the plurality of mobile devices that are associated with at least one qualifier of the one or more qualifiers, generate a list of one or more mobile devices based on the association with the at least one qualifier, and transmit the list of one or more mobile device to a data visualization system;

the data visualization system comprising at least one processor and at least one non-transitory memory, configured to:

identify that one or more mobile devices from the list of one or more mobile devices is located at a selected geographic area, transmit a list of one or more mobile devices located at the selected geographic area and associated with the at least one qualifier, and generate a graphical image of the one or more mobile devices located at the selected geographic area and associated with the at least one qualifier; and a common campaign system comprising at least one processor and at least one non-transitory memory, configured to:

transmit the at least one qualifier to at least the analytics system to identify the one or more mobile devices associated with the at least one qualifier, receive the list of one or more mobile devices located at the selected geographic area and associated with the at least one qualifier, and send a message to the one or more mobile devices on the list of one or more mobile devices located at the selected geographic area and associated with the at least one qualifier.

2. The system of claim 1, wherein the analytics system and the data visualization system are configured to provide an estimate of a number of mobile devices located in the selected geographic area and associated with the at least one qualifier.

3. The system of claim 2, wherein the estimate comprises at least one of an average number of mobile devices over a period of time, a maximum number of mobiles devices over a period of time, a minimum number of mobile devices over a period of time, or most frequent number of mobile device over a period of time.

4. The system of claim 1, wherein the data visualization system is configured to provide a map to the common campaign system providing the location of the one or more mobile devices associated with the one or more qualifiers in near real time.

5. The system of claim 1, wherein one or more inputs are provided to the common campaign system to identify the at least one qualifier and the selected geographic area for association with the one or more mobile devices.

6. The system of claim 1, wherein the data visualization system is configured to identify the location of the one or more mobile devices using at least one of a global positioning system, trilateration, an interaction between an application embedded in a mobile device, and an identification that a mobile device is utilizing a particular wireless local area network.

7. The system of claim 1, wherein the message is related to the at least one qualifier or the selected geographic area.

8. A method of targeting one or more mobile devices with a message, the method comprising:

receiving and analyzing, by an analytics system, raw data for a plurality of mobile devices gathered through interactions between each mobile device user and a corresponding mobile device;

associating, by the analytics system, each mobile device of the plurality of mobile devices with one or more qualifiers based on the analysis of the raw data for each mobile device, wherein the one or more qualifiers comprise at least one characteristic associated with at least one of a mobile device, a mobile device user, or a mobile device owner;

identifying, by the analytics system based on the analyzing and associating, one or more mobile devices of the plurality of mobile devices that are associated with at least one qualifier of the one or more qualifiers;

identifying, by a data visualization system, that one or more mobile devices of the one or more mobile devices associated with the at least one qualifier is located in a selected geographic area;

generating, by the data visualization system, a list and a graphical image of the one or more mobile devices located in the selected geographic area and associated with the at least one qualifier; and transmitting, by a common campaign system, a message to the one or more mobile devices from the list of the one or more mobile devices, wherein at least one of the one or more mobile devices from the list of the one or more mobile devices is located in the selected geographic area when the message is transmitted.

9. The method of claim 8, wherein the message is related to the at least one qualifier or the selected geographic area.

10. The method of claim 8, further comprising:

identifying, by the analytics system, at a second time a second set of one or more mobile devices associated with the at least one qualifier, wherein the second set of one or more mobile devices comprises at least one of a different number of mobile devices or at least one different mobile device;

identifying, by the data visualization system, at the second time that one or more mobile devices of the second set of one or more mobile devices is located in the selected geographic area;

generating, by the data visualization system, a second list of the one or more mobile devices of the second set of one or more mobile devices located in the selected geographic area; and transmitting, by the common campaign system, a second message to the one or more mobile devices from the second list of the second set of one or more mobile devices, wherein at least one of the one or more mobile devices from the second list of the second set of one or more mobile devices is located in the selected geographic area when the message is transmitted.

11. The method of claim 10, wherein the message comprises a selectable link to an advertisement or an information message received by at least a message receiving mobile device of the one or more mobile devices associated with the at least one qualifier, and wherein selecting the link through the message receiving mobile device triggers the transmission of a signal which excludes the message receiving mobile device from the second set of one or more mobile devices associated with the at least one qualifier.

12. The method of claim 8, wherein identifying the one or more mobile devices associated with the at least one qualifier comprises relating the raw data with the one or more qualifiers using heuristics.

13. The method of claim 12, wherein identifying the one or more mobile device associated with the at least one qualifier comprises identifying profile data associated with a mobile device and relating the profile data with the one or more qualifiers using heuristics.

14. The method of claim 8, where the message is transmitted to the one or more mobile devices using one or more different interfaces.

15. The method of claim 8, further comprising:
providing an estimate of the number of mobile devices which may be associated with the at least one qualifier and may be located in the selected geographic area at a future time.

16. The method of claim 15, further comprising providing a cost of transmitting one or more messages to identified mobile devices associated with the at least one qualifier and located in the selected geographic area based on the estimate.

17. The method of claim 15, further comprising providing a map showing the locations of each mobile device associated with the at least one qualifier in near real time.

18. The method of claim 15, further comprising:
identifying, by the analytics system, at a second time a second set of one or more mobile devices associated with the at least one qualifier, wherein the second time is a time later than the time the estimate was provided;
identifying, by the analytics system, at the second time that one or more mobile devices of the second set of one or more mobile devices is located in the selected geographic area;
generating, by the data visualization system, a list and a graphical image of the one or more mobile devices of the second set of one or more mobile devices located in the selected geographic area; and
transmitting, by the common campaign system, a message to the one or more mobile devices from the list of the second set of one or more mobile devices, wherein at least one of the one or more mobile devices from the list of the second set of one or more mobile devices is located in the selected geographic area when the message is transmitted.

19. The method of claim 18, wherein the second set of one or more mobile devices comprises at least one of a different number of mobile devices or at least one different mobile device.

20. The method of claim 18, wherein the message is related to the at least one qualifier or the selected geographic area.

* * * * *